(12) United States Patent
Ohue

(10) Patent No.: US 11,960,178 B2
(45) Date of Patent: Apr. 16, 2024

(54) DISPLAY DEVICE WITH LIGHT-BLOCKING COUPLING WIRING

(71) Applicant: Japan Display Inc., Tokyo (JP)

(72) Inventor: Yoshihide Ohue, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/228,130

(22) Filed: Jul. 31, 2023

(65) Prior Publication Data

US 2023/0375886 A1 Nov. 23, 2023

Related U.S. Application Data

(63) Continuation of application No. 17/832,100, filed on Jun. 3, 2022, now Pat. No. 11,768,409, which is a
(Continued)

(30) Foreign Application Priority Data

Dec. 11, 2019 (JP) ................................. 2019-224075

(51) Int. Cl.
*G02F 1/1345* (2006.01)
*G02F 1/1334* (2006.01)
(Continued)

(52) U.S. Cl.
CPC .......... *G02F 1/1345* (2013.01); *G02F 1/1334* (2013.01); *G02F 1/133512* (2013.01);
(Continued)

(58) Field of Classification Search
CPC ..................... G02F 1/133512; G02F 1/1345
See application file for complete search history.

(56) References Cited

U.S. PATENT DOCUMENTS

2006/0139556 A1 6/2006 Ahn et al.
2009/0322979 A1 12/2009 Yang et al.
(Continued)

FOREIGN PATENT DOCUMENTS

CN 207337002 U 5/2018
CN 109613743 A 4/2019
(Continued)

OTHER PUBLICATIONS

Chinese First Notice of Reasons for Refusal and English Translation from corresponding Chinese Patent Application No. 202080085365. 2, dated Aug. 30, 2023, 10 pages.
(Continued)

*Primary Examiner* — Lauren Nguyen
(74) *Attorney, Agent, or Firm* — K&L Gates LLP

(57) ABSTRACT

According to an aspect, a display device includes: an array substrate comprising a plurality of pixel electrodes; a counter substrate comprising a common electrode in a position at least overlapping the pixel electrodes; a liquid crystal layer between the array substrate and the counter substrate; and a light source disposed so as to emit light into a side surface of the array substrate or a side surface of the counter substrate. The array substrate includes, in a display region: a plurality of signal lines arranged in a first direction with spaces between the signal lines; a plurality of scanning lines arranged in a second direction with spaces between the scanning lines; and common potential wiring provided outside the display region. The counter substrate comprises light-blocking coupling wiring that couples the common electrode to a conductive first power feeding portion.

6 Claims, 19 Drawing Sheets

Related U.S. Application Data continuation of application No. PCT/JP2020/044172, filed on Nov. 27, 2020.

(51) Int. Cl.
    *G02F 1/1335*      (2006.01)
    *G02F 1/1337*      (2006.01)
    *G02F 1/1339*      (2006.01)
    *G02F 1/1343*      (2006.01)
    *G02F 1/1362*      (2006.01)

(52) U.S. Cl.
    CPC .......... *G02F 1/1337* (2013.01); *G02F 1/1339* (2013.01); *G02F 1/134309* (2013.01); *G02F 1/136286* (2013.01)

(56) References Cited

U.S. PATENT DOCUMENTS

| | | | | |
|---|---|---|---|---|
| 2010/0271572 A1* | 10/2010 | Yokogawa | ............ | G02F 1/1345 349/96 |
| 2015/0311130 A1 | 10/2015 | Zhang et al. | | |
| 2018/0031758 A1* | 2/2018 | Mizuno | ............ | G02F 1/133605 |
| 2020/0150490 A1 | 5/2020 | Mizuno et al. | | |
| 2021/0116759 A1 | 4/2021 | Mizuno et al. | | |
| 2022/0113593 A1 | 4/2022 | Mizuno et al. | | |

FOREIGN PATENT DOCUMENTS

| | | |
|---|---|---|
| JP | H10148840 A | 6/1998 |
| JP | 2002214640 A | 7/2002 |
| JP | 2007-017474 A | 1/2007 |
| JP | 2007-334023 A | 12/2007 |
| JP | 2010-009000 A | 1/2010 |
| JP | 2010-271691 A | 12/2010 |
| JP | 2018-021974 A | 2/2018 |
| KR | 20060132414 A | 12/2006 |

OTHER PUBLICATIONS

International Search Report issued in International Patent Application No. PCT/JP2020/044172 dated Feb. 9, 2021 and English translation of same. 5 pages.

Written issued in International Patent Application No. PCT/JP2020/044172 dated Feb. 9, 2021. 4 pages.

\* cited by examiner

DISPLAY DEVICE WITH LIGHT-BLOCKING COUPLING WIRING

CROSS-REFERENCE TO RELATED APPLICATION

The present application is a continuation of U.S. patent application Ser. No. 17/832,100, filed on Jun. 3, 2022, which is a continuation of International Patent Application No. PCT/JP2020/044172, filed on Nov. 27, 2020, which application claims the benefit of priority from Japanese Patent Application No. 2019-224075 filed on Dec. 11, 2019, the entire contents of which are incorporated herein by reference.

BACKGROUND

1. Technical Field

What is disclosed herein relates to a display device.

2. Description of the Related Art

Japanese Patent Application Laid-open Publication No. 2018-021974 (JP-A-2018-021974) describes a display device including a first light-transmitting substrate, a second light-transmitting substrate disposed so as to be opposed to the first light-transmitting substrate, a liquid crystal layer including polymer-dispersed liquid crystals filled between the first light-transmitting substrate and the second light-transmitting substrate, and at least one light emitter disposed so as to be opposed to at least one of side surfaces of the first light-transmitting substrate and the second light-transmitting substrate.

In the display device described in JP-A-2018-021974, a viewer on one surface side of a display panel can view a background on the other surface side opposite to the one surface side. Unless a peripheral region outside a display region transmits light, the background cannot be seen, which may cause a sense of discomfort. Therefore, the peripheral region outside the display region preferably also allows the background on the other surface side opposite to the one surface side to be seen from the one surface side.

Therefore, the amount of metal material disposed in the peripheral region of a counter substrate needs to be reduced in order to improve transmittance in the peripheral region of the counter substrate. Reducing the amount of metal material increases the resistance between common potential wiring of an array substrate and a common electrode located on the counter substrate, which may increase likelihood of crosstalk.

For the foregoing reasons, there is a need for a display device that improves display quality while reducing the sense of discomfort when a user views the background in peripheral region outside the display region.

SUMMARY

According to an aspect, a display device includes: an array substrate comprising a plurality of pixel electrodes; a counter substrate comprising a common electrode in a position at least overlapping the pixel electrodes; a liquid crystal layer between the array substrate and the counter substrate; and a light source disposed so as to emit light into a side surface of the array substrate or a side surface of the counter substrate. The array substrate includes, in a display region: a plurality of signal lines arranged in a first direction with spaces between the signal lines; a plurality of scanning lines arranged in a second direction with spaces between the scanning lines; and common potential wiring provided outside the display region. The counter substrate comprises light-blocking coupling wiring that couples the common electrode to a conductive first power feeding portion.

DETAILED DESCRIPTION

Figure 1:
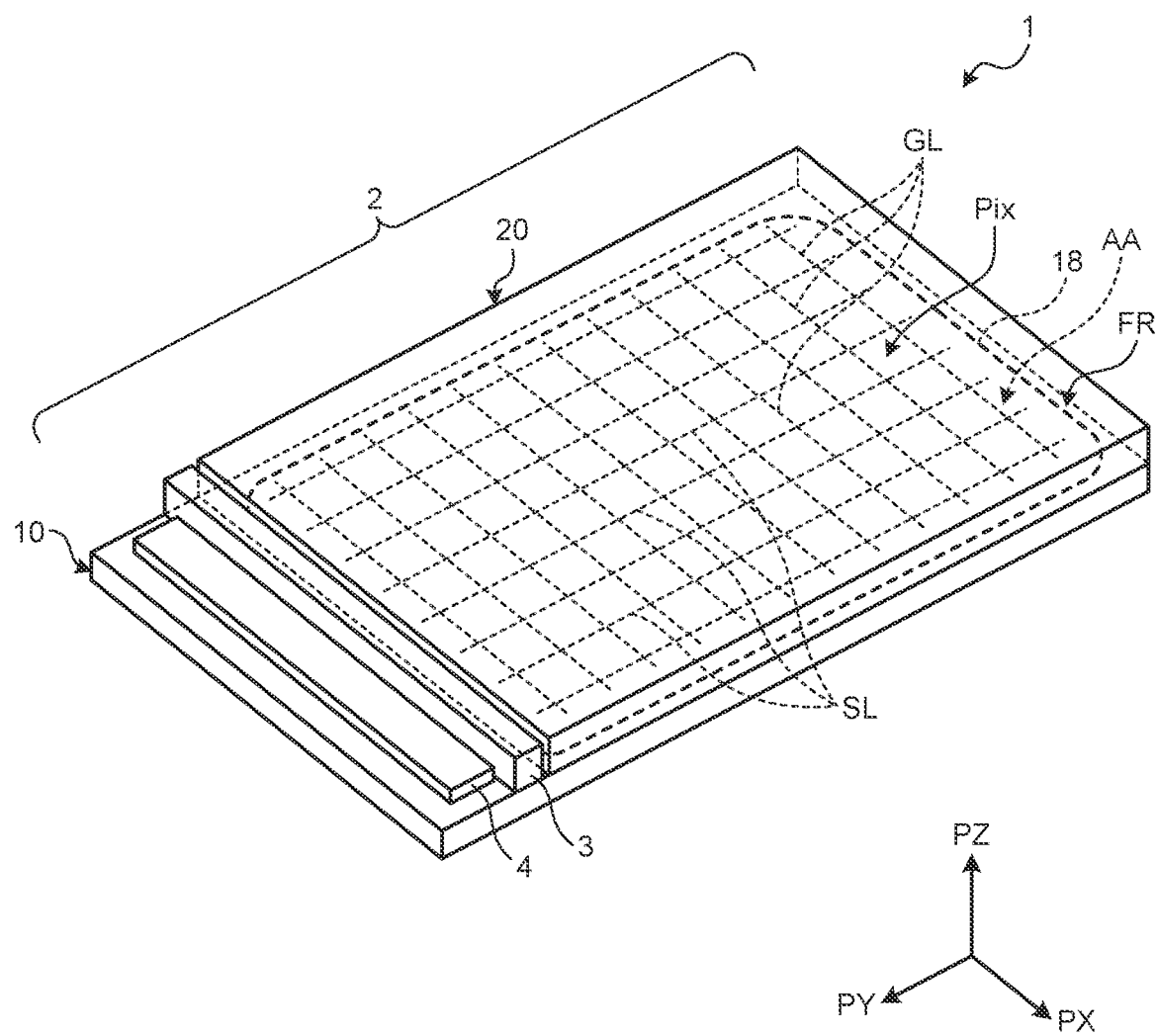
FIG. 1 is a perspective view illustrating an example of a display device according to an embodiment of the present disclosure.

The following describes a mode (embodiment) for carrying out the present disclosure in detail with reference to the drawings. The present disclosure is not limited by the description of the embodiment given below. Components described below include those easily conceivable by those skilled in the art or those substantially identical thereto.

Moreover, the components described below can be combined as appropriate. What is disclosed herein is merely an example, and the present disclosure naturally encompasses appropriate modifications easily conceivable by those skilled in the art while maintaining the gist of the disclosure. To further clarify the description, the drawings schematically illustrate, for example, widths, thicknesses, and shapes of various parts as compared with actual aspects thereof, in some cases. However, they are merely examples, and interpretation of the present disclosure is not limited thereto. The same element as that illustrated in a drawing that has already been discussed is denoted by the same reference numeral through the description and the drawings, and detailed description thereof will not be repeated in some cases where appropriate.

In this disclosure, when an element is described as being "on" another element, the element can be directly on the other element, or there can be one or more elements between the element and the other element.

Figure 2:
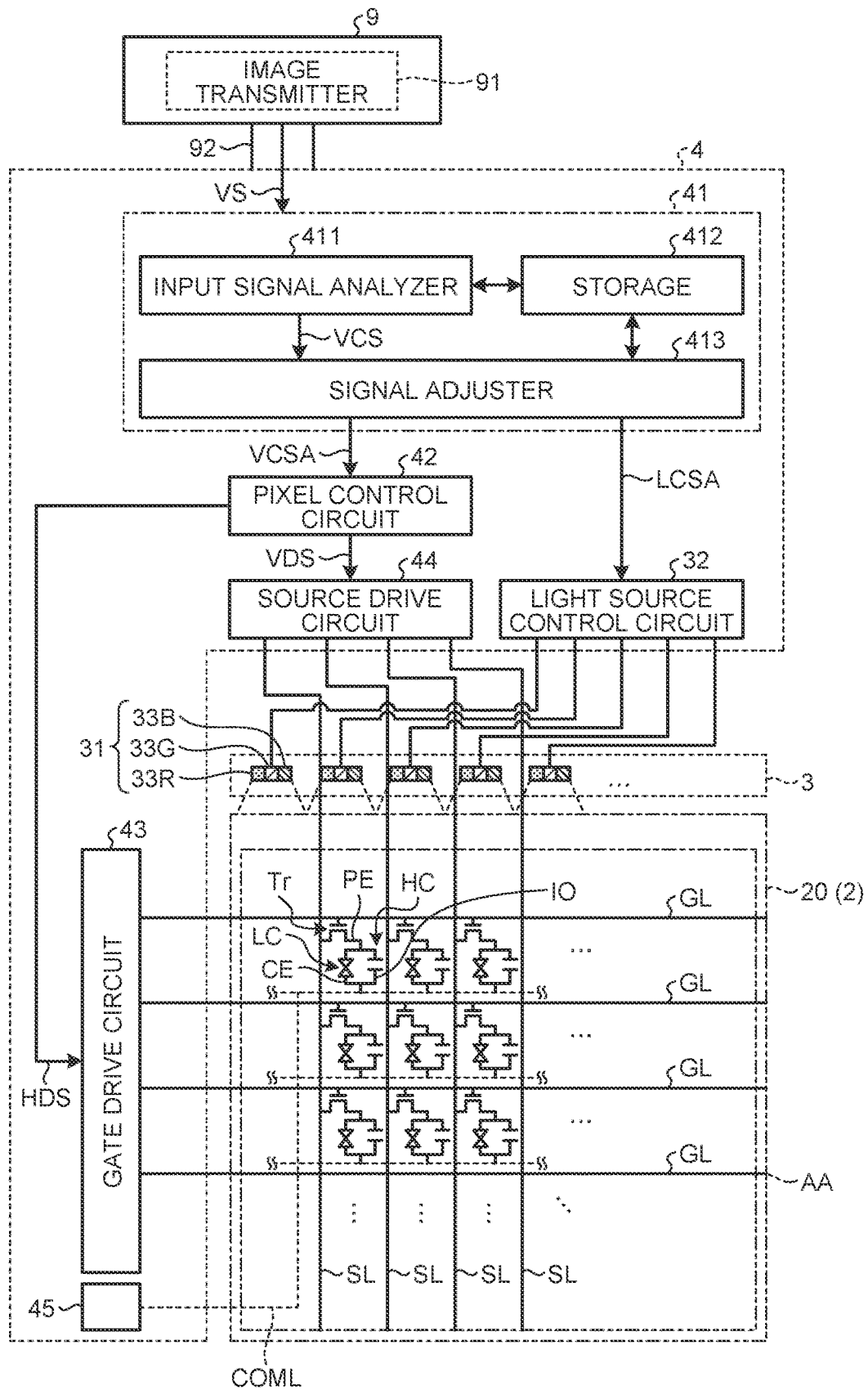
FIG. 2 is a block diagram illustrating the display device of the embodiment.
Figure 3:
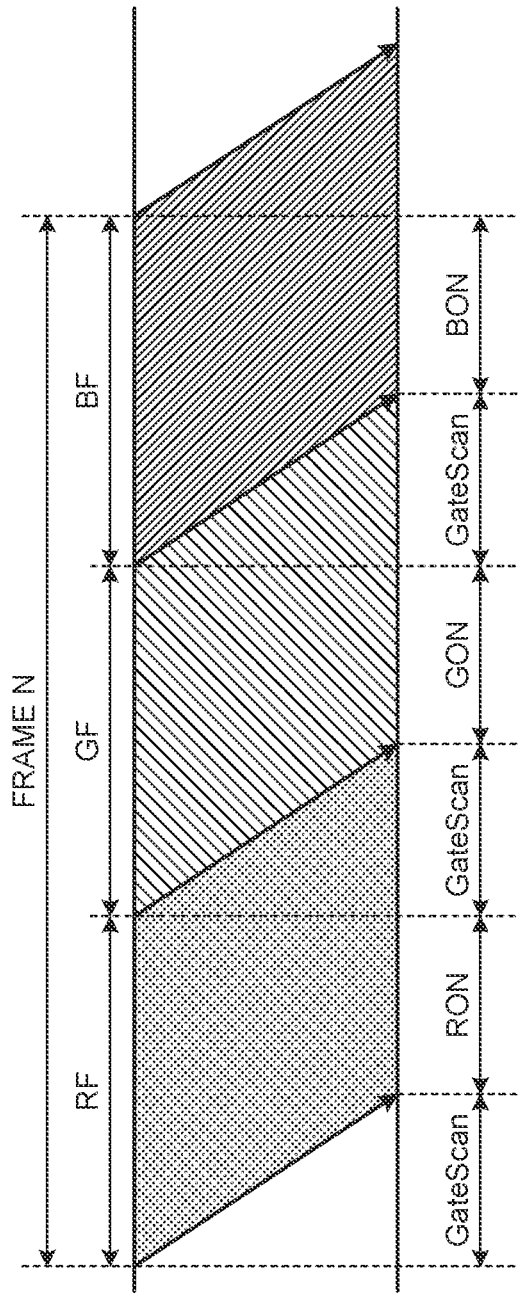
FIG. 3 is a timing diagram explaining timing of light emission by a light source in a field-sequential system of the embodiment.

FIG. 1 is a perspective view illustrating an example of a display device according to an embodiment of the present disclosure. FIG. 2 is a block diagram illustrating the display device of FIG. 1. FIG. 3 is a timing diagram explaining timing of light emission by a light source in a field-sequential system.

As illustrated in FIG. 1, a display device 1 includes a display panel 2, a light source 3, and a drive circuit 4. A direction PX denotes one direction in the plane of the display panel 2. A second direction PY denotes a direction orthogonal to the direction PX. A third direction PZ denotes a direction orthogonal to the PX-PY plane.

Figure 5:
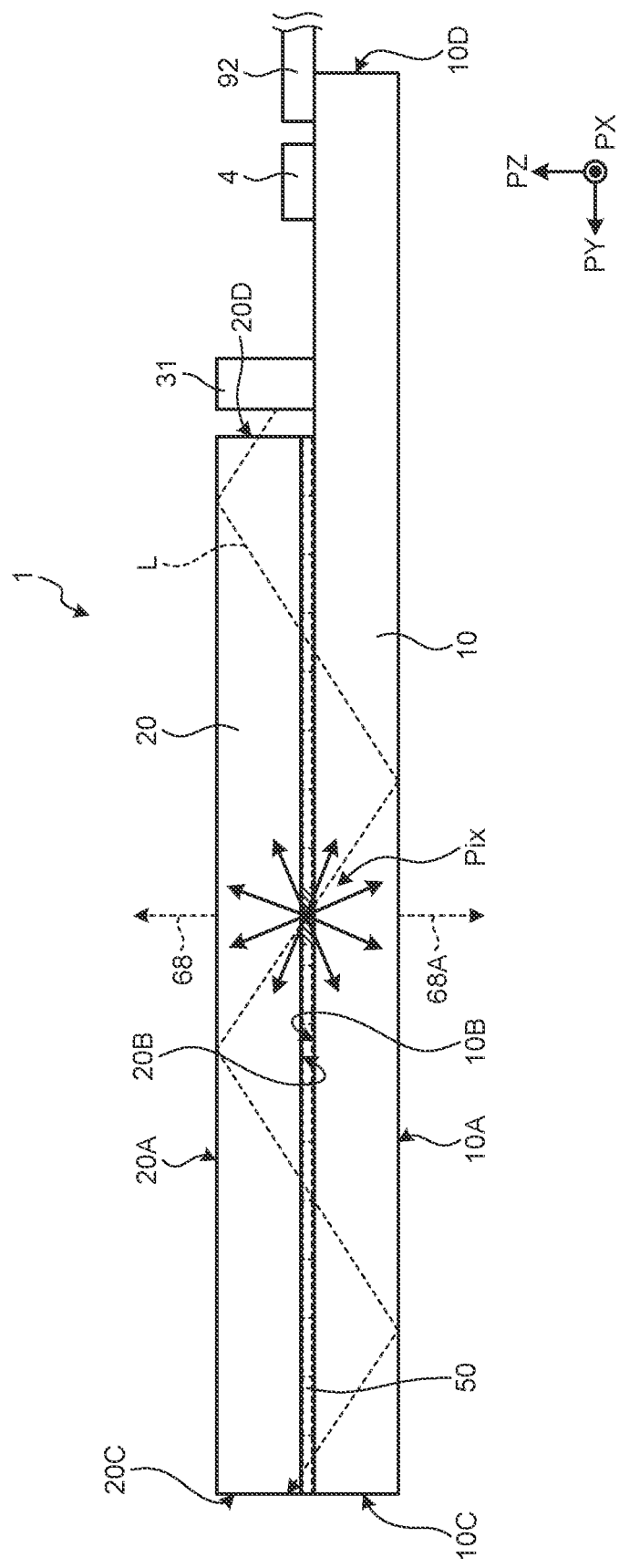
FIG. 5 is a sectional view illustrating an example of a section of the display device of FIG. 1.

The display panel 2 includes an array substrate 10, a counter substrate 20, and a liquid crystal layer 50 (refer to FIG. 5). The counter substrate 20 is opposed to a surface of the array substrate 10 in a direction orthogonal thereto (in the direction PZ illustrated in FIG. 1). In the liquid crystal layer 50 (refer to FIG. 5), polymer-dispersed liquid crystals LC (described later) are sealed by the array substrate 10, the counter substrate 20, and a sealing portion 18.

As illustrated in FIG. 1, the display panel 2 has a display region AA capable of displaying images and a peripheral region FR outside the display region AA. A plurality of pixels Pix are arranged in a matrix having a row-column configuration in the display region AA. In the present disclosure, a row refers to a pixel row including m of the pixels Pix arranged in one direction. In addition, a column refers to a pixel column including n pixels Pix arranged in a direction orthogonal to the direction in which the rows extend. The values of m and n are determined depending on a display resolution in the vertical direction and a display resolution in the horizontal direction. A plurality of scanning lines GL are provided corresponding to the rows, and a plurality of signal lines SL are provided corresponding to the columns.

The light source 3 includes a plurality of light emitters 31. As illustrated in FIG. 2, a light source control circuit (light source control circuit) 32 is included in the drive circuit 4. The light source control circuit 32 may be a circuit separate from the drive circuit 4. The light emitters 31 are electrically coupled to the light source control circuit 32 through wiring in the array substrate 10.

As illustrated in FIG. 1, the drive circuit 4 is fixed to the surface of the array substrate 10. As illustrated in FIG. 2, the drive circuit 4 includes a signal processing circuit 41, a pixel control circuit 42, a gate drive circuit 43, a source drive circuit 44, and a common potential drive circuit 45. The array substrate 10 has an area in the PX-PY plane larger than that of the counter substrate 20, and the drive circuit 4 is provided on a projecting portion of the array substrate 10 exposed from the counter substrate 20.

The signal processing circuit 41 receives a first input signal (such as a red-green-blue (RGB) signal) VS from an image transmitter 91 of an external host controller 9 through a flexible substrate 92.

The signal processing circuit 41 includes an input signal analyzer 411, a storage 412, and a signal adjuster 413. The input signal analyzer 411 generates a second input signal VCS based on the externally received first input signal VS.

The second input signal VCS is a signal for determining a gradation value to be given to each of the pixels Pix of the display panel 2 based on the first input signal VS. In other words, the second input signal VCS is a signal including gradation information on the gradation value of each of the pixels Pix.

The signal adjuster 413 generates a third input signal VCSA from the second input signal VCS. The signal adjuster 413 transmits the third input signal VCSA to the pixel control circuit 42, and transmits a light source control signal LCSA to the light source control circuit 32. The light source control signal LCSA is a signal including information on light quantities of the light emitters 31 set in accordance with, for example, input gradation values given to the pixels Pix. For example, when a darker image is displayed, the light quantities of the light emitters 31 are set smaller. When a brighter image is displayed, the light quantities of the light emitters 31 are set larger.

The pixel control circuit 42 generates a horizontal drive signal HDS and a vertical drive signal VDS based on the third input signal VCSA. In the present embodiment, since the display device 1 is driven by the field-sequential system, the horizontal drive signal HDS and the vertical drive signal VDS are generated for each color emittable by the light emitters 31.

The gate drive circuit 43 sequentially selects the scanning lines GL of the display panel 2 based on the horizontal drive signal HDS during one vertical scanning period. The scanning lines GL can be selected in any order.

The source drive circuit 44 supplies a gradation signal corresponding to the output gradation value of each of the pixels Pix to a corresponding one of the signal lines SL of the display panel 2 based on the vertical drive signal VDS during one horizontal scanning period.

In the present embodiment, the display panel 2 is an active-matrix panel. Hence, the display panel 2 is provided with the signal (source) lines SL extending in the second direction PY and the scanning (gate) lines GL extending in the first direction PX in a plan view, and switching elements Tr are provided at intersecting portions between the signal lines SL and the scanning lines GL.

A thin-film transistor is used as each of the switching elements Tr. A bottom-gate transistor or a top-gate transistor may be used as an example of the thin-film transistor. Although a single-gate thin film transistor is exemplified as the switching element Tr, the switching element Tr may be a double-gate transistor. One of the source electrode and the drain electrode of the switching element Tr is coupled to a corresponding one of the signal lines SL. The gate electrode of the switching element Tr is coupled to a corresponding one of the scanning lines GL. The other of the source electrode and the drain electrode is coupled to one end of a capacitor of the polymer-dispersed liquid crystal LC described later. The capacitor of the polymer-dispersed liquid crystal LC is coupled at one end thereof to the switching element Tr through a pixel electrode PE, and coupled at the other end thereof to common potential wiring COML through a common electrode CE. A holding capacitance HC is generated between the pixel electrode PE and a holding capacitance electrode IO electrically coupled to the common potential wiring COML. A potential of the common potential wiring COML is supplied by the common potential drive circuit 45.

Each of the light emitters 31 includes a light emitter 33R of a first color (such as red), a light emitter 33G of a second color (such as green), and a light emitter 33B of a third color (such as blue). The light source control circuit 32 controls the light emitter 33R of the first color, the light emitter 33G of the second color, and the light emitter 33B of the third color so as to emit light in a time-division manner based on the light source control signal LCSA. In this manner, the light emitter 33R of the first color, the light emitter 33G of the second color, and the light emitter 33B of the third color are driven based on the field-sequential system.

As illustrated in FIG. 3, in a first sub-frame (first predetermined time) RF, the light emitter 33R of the first color emits light during a first color light emission period RON, and the pixels Pix selected during one vertical scanning period GateScan scatter light to perform display. On the entire display panel 2, if the gradation signal corresponding to the output gradation value of each of the pixels Pix is supplied to the above-described signal lines SL for the pixels Pix selected during the one vertical scanning period GateScan, only the first color is lit up during the first color light emission period RON.

Then, in a second sub-frame (second predetermined time) GF, the light emitter 33G of the second color emits light during a second color light emission period GON, and the pixels Pix selected during the one vertical scanning period GateScan scatter light to perform display. On the entire display panel 2, if the gradation signal corresponding to the output gradation value of each of the pixels Pix is supplied to the above-described signal lines SL for the pixels Pix selected during the one vertical scanning period GateScan, only the second color is lit up during the second color light emission period GON.

Further, in a third sub-frame (third predetermined time) BF, the light emitter 33B of the third color emits light during a third color light emission period BON, and the pixels Pix selected during the one vertical scanning period GateScan scatter light to perform display. On the entire display panel 2, if the gradation signal corresponding to the output gradation value of each of the pixels Pix is supplied to the above-described signal lines SL for the pixels Pix selected during the one vertical scanning period GateScan, only the third color is lit up during the third color light emission period BON.

Since a human eye has limited temporal resolving power, and produces an afterimage, an image with a combination of three colors is recognized in a period of one frame (1F). The field-sequential system can eliminate the need for a color filter, and thus can reduce an absorption loss by the color filter. As a result, higher transmittance can be obtained. In the color filter system, one pixel is made up of sub-pixels obtained by dividing each of the pixels Pix into the sub-pixels of the first color, the second color, and the third color. In contrast, in the field-sequential system, the pixel need not be divided into the sub-pixels in such a manner. A fourth sub-frame may be further included to emit light in a fourth color different from any one of the first color, the second color, and the third color.

Figure 4:
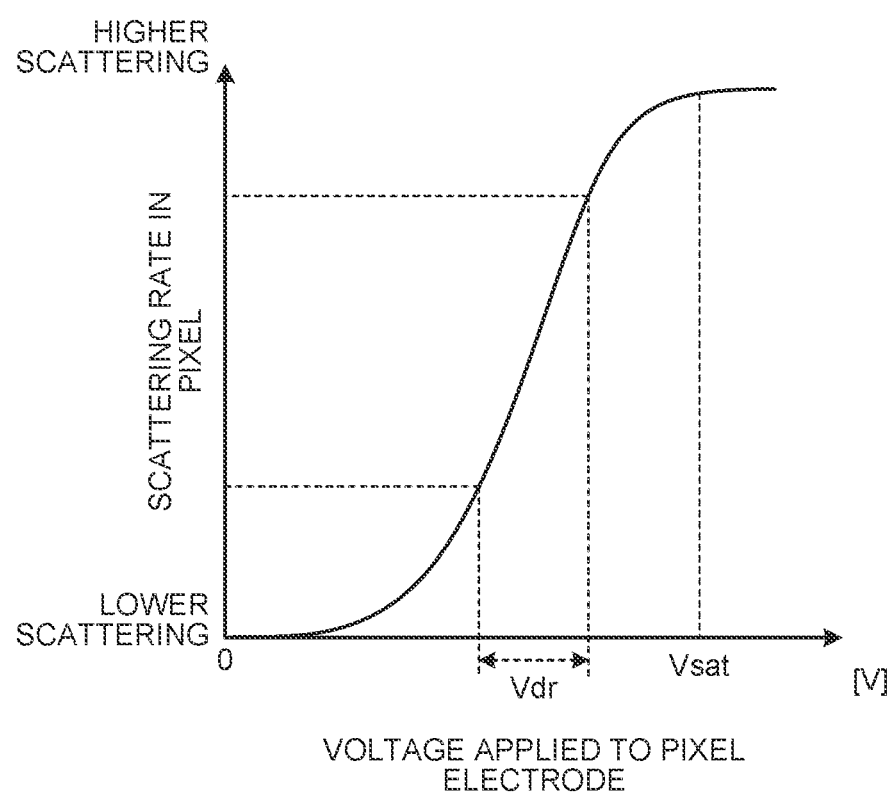
FIG. 4 is an explanatory diagram illustrating a relation between a voltage applied to a pixel electrode and a scattering state of a pixel.
Figure 6:
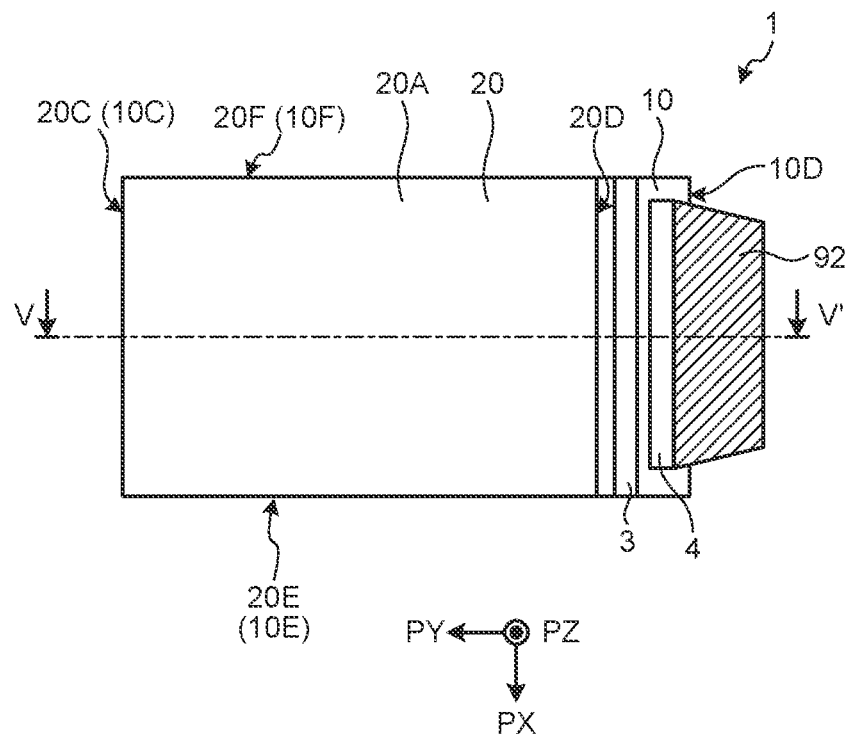
FIG. 6 is a plan view illustrating a planar surface of the display device of FIG. 1.
Figure 7:
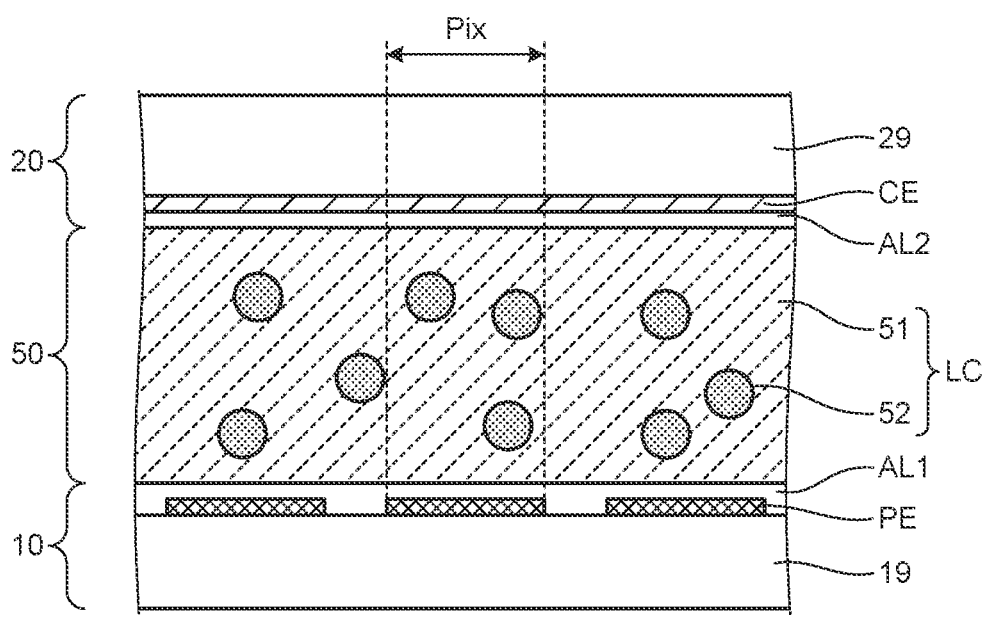
FIG. 7 is an enlarged sectional view obtained by enlarging a liquid crystal layer portion of FIG. 5.
Figure 8:
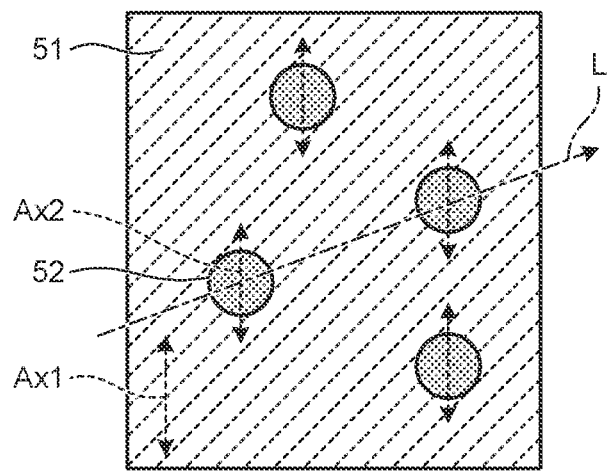
FIG. 8 is a sectional view for explaining a non-scattering state in the liquid crystal layer.
Figure 9:
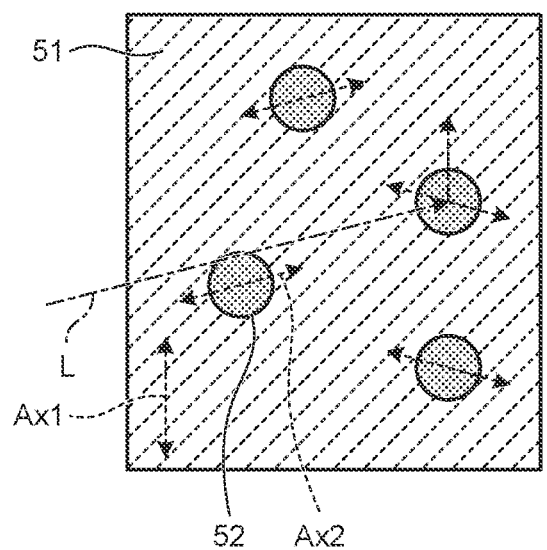
FIG. 9 is a sectional view for explaining the scattering state in the liquid crystal layer.

FIG. 4 is an explanatory diagram illustrating a relation between a voltage applied to the pixel electrode and a scattering state of the pixel. FIG. 5 is a sectional view illustrating an example of a section of the display device of FIG. 1. FIG. 6 is a plan view illustrating a planar surface of the display device of FIG. 1. FIG. 5 is a V-V' sectional view of FIG. 6. FIG. 7 is an enlarged sectional view obtained by enlarging the liquid crystal layer portion of FIG. 5. FIG. 8 is a sectional view for explaining a non-scattering state in the liquid crystal layer. FIG. 9 is a sectional view for explaining the scattering state in the liquid crystal layer.

If the gradation signal corresponding to the output gradation value of each of the pixels Pix is supplied to the above-described signal lines SL for the pixels Pix selected during the one vertical scanning period GateScan, the voltage applied to the pixel electrode PE changes with the gradation signal. The change in the voltage applied to the pixel electrode PE changes the voltage between the pixel electrode PE and the common electrode CE. The scattering state of the liquid crystal layer 50 for each of the pixels Pix is controlled in accordance with the voltage applied to the pixel electrode PE, and the scattering rate in the pixels Pix changes, as illustrated in FIG. 4.

As illustrated in FIG. 4, the change in the scattering rate in the pixel Pix is smaller when the voltage applied to the pixel electrode PE is substantially equal to or higher than a saturation voltage Vsat. Therefore, the drive circuit 4 changes the voltage applied to the pixel electrode PE in accordance with the vertical drive signal VDS within a voltage range Vdr lower than the saturation voltage Vsat.

As illustrated in FIGS. 5 and 6, the array substrate 10 has a first principal surface 10A, a second principal surface 10B, a first side surface 10C, a second side surface 10D, a third side surface 10E, and a fourth side surface 10F. The first principal surface 10A and the second principal surface 10B are parallel flat surfaces. The first side surface 10C and the second side surface 10D are parallel flat surfaces. The third side surface 10E and the fourth side surface 10F are parallel flat surfaces.

As illustrated in FIGS. 5 and 6, the counter substrate 20 has a first principal surface 20A, a second principal surface 20B, a first side surface 20C, a second side surface 20D, a third side surface 20E, and a fourth side surface 20F. The first principal surface 20A and the second principal surface 20B are parallel flat surfaces. The first side surface 20C and the second side surface 20D are parallel flat surfaces. The third side surface 20E and the fourth side surface 20F are parallel flat surfaces.

As illustrated in FIGS. 5 and 6, the light source 3 is opposed to the second side surface 20D of the counter substrate 20. The light source 3 may also be called a side light source. As illustrated in FIG. 5, the light source 3 emits light-source light L to the second side surface 20D of the counter substrate 20. The second side surface 20D of the counter substrate 20 opposed to the light source 3 serves as a plane of light incidence.

As illustrated in FIG. 5, the light-source light L emitted from the light source 3 propagates in a direction (second direction PY) away from the second side surface 20D while being reflected by the first principal surface 10A of the array substrate 10 and the first principal surface 20A of the counter substrate 20. When the light-source light L travels outward from the first principal surface 10A of the array substrate 10 or the first principal surface 20A of the counter substrate 20, the light-source light L enters a medium having a lower refractive index from a medium having a higher refractive index. Hence, if the angle of incidence of the light-source light L incident on the first principal surface 10A of the array substrate 10 or the first principal surface 20A of the counter substrate 20 is larger than a critical angle, the light-source light L is totally reflected by the first principal surface 10A of the array substrate 10 or the first principal surface 20A of the counter substrate 20.

As illustrated in FIG. 5, the light-source light L that has propagated in the array substrate 10 and the counter substrate 20 is scattered by any of the pixels Pix including the liquid crystals placed in the scattering state, and the angle of incidence of the scattered light becomes an angle smaller than the critical angle. Thus, emission light 68 or 68A is emitted outward from the first principal surface 20A of the counter substrate 20 or the first principal surface 10A of the array substrate 10. The emission light 68 or 68A emitted outward from the first principal surface 20A of the counter substrate 20 or the first principal surface 10A of the array substrate 10, respectively, is viewed by a viewer. The following describes the polymer-dispersed liquid crystals placed in the scattering state and the polymer-dispersed liquid crystals in a non-scattering state, using FIGS. 7 to 9.

As illustrated in FIG. 7, the array substrate 10 is provided with a first orientation film AL1. The counter substrate 20 is provided with a second orientation film AL2. The first and the second orientation films AL1 and AL2 are, for example, vertical orientation films.

A solution containing the liquid crystals and a monomer is filled between the array substrate 10 and the counter substrate 20. Then, in a state where the monomer and the liquid crystals are oriented by the first and the second orientation films AL1 and AL2, the monomer is polymerized by ultraviolet rays or heat to form a bulk 51. This process forms the liquid crystal layer 50 including the reverse-mode polymer-dispersed liquid crystals LC in which the liquid crystals are dispersed in gaps of a polymer network formed in a mesh shape.

In this manner, the polymer-dispersed liquid crystals LC include the bulk 51 formed of the polymer and a plurality of fine particles 52 dispersed in the bulk 51. The fine particles 52 are formed of the liquid crystals. Both the bulk 51 and the fine particles 52 have optical anisotropy.

The orientation of the liquid crystals included in the fine particles 52 is controlled by a voltage difference between the pixel electrode PE and the common electrode CE. The orientation of the liquid crystals is changed by the voltage applied to the pixel electrode PE. The degree of scattering of light passing through the pixels Pix changes with change in the orientation of the liquid crystals.

For example, as illustrated in FIG. 8, when no voltage is applied between the pixel electrode PE and the common electrode CE, the direction of an optical axis Ax1 of the bulk 51 is substantially equal to the direction of an optical axis Ax2 of the fine particles 52. The optical axis Ax2 of the fine particles 52 is parallel to the direction PZ of the liquid crystal layer 50. The optical axis Ax1 of the bulk 51 is parallel to the direction PZ of the liquid crystal layer 50 regardless of whether a voltage is applied.

Ordinary-ray refractive indices of the bulk 51 and the fine particles 52 are equal to each other. When no voltage is applied between the pixel electrode PE and the common electrode CE, the difference of refractive index between the bulk 51 and the fine particles 52 is zero in all directions. The liquid crystal layer 50 is placed in the non-scattering state of not scattering the light-source light L. The light-source light L propagates in a direction away from the light source 3 (the light emitter 31) while being reflected by the first principal surface 10A of the array substrate 10 and the first principal surface 20A of the counter substrate 20. When the liquid crystal layer 50 is in the non-scattering state of not scattering the light-source light L, a background on the first principal surface 20A side of the counter substrate 20 is visible from the first principal surface 10A of the array substrate 10, and a background on the first principal surface 10A side of the array substrate 10 is visible from the first principal surface 20A of the counter substrate 20.

As illustrated in FIG. 9, in the space between the pixel electrode PE and the common electrode CE having a voltage applied thereto, the optical axis Ax2 of the fine particles 52 is inclined by an electric field generated between the pixel electrode PE and the common electrode CE. Since the optical axis Ax1 of the bulk 51 is not changed by the electric field, the direction of the optical axis Ax1 of the bulk 51 differs from the direction of the optical axis Ax2 of the fine particles 52. The light-source light L is scattered in the pixel Pix including the pixel electrode PE having a voltage applied thereto. As described above, the viewer views a part of the scattered light-source light L emitted outward from the first principal surface 10A of the array substrate 10 or the first principal surface 20A of the counter substrate 20.

In the pixel Pix including the pixel electrode PE having no voltage applied thereto, the background on the first principal surface 20A side of the counter substrate 20 is visible from the first principal surface 10A of the array substrate 10, and the background on the first principal surface 10A side of the array substrate 10 is visible from the first principal surface 20A of the counter substrate 20. In the display device 1 of the present embodiment, when the first input signal VS is received from the image transmitter 91, the voltage is applied to the pixel electrode PE of the pixel Pix to display an image, and the image based on the third input signal VCSA becomes visible together with the background. In this manner, an image is displayed in the display region when the polymer-dispersed liquid crystals are in a scattering state.

The light-source light L is scattered in the pixel Pix including the pixel electrode PE having a voltage applied thereto the voltage, and emitted outward to display the image, which is displayed so as to be superimposed on the background. In other words, the display device 1 of the present embodiment combines the emission light 68 or the emission light 68A with the background to display the image so as to be superimposed on the background.

A potential of each of the pixel electrodes PE (refer to FIG. 7) written during the one vertical scanning period GateScan illustrated in FIG. 3 needs to be held during at least one of the first color light emission period RON, the second color light emission period GON, and the third color light emission period BON coming after each one vertical scanning period GateScan. If the written potential of each of the pixel electrodes PE (refer to FIG. 7) cannot be held during at least one of the first color light emission period RON, the second color light emission period GON, and the third color light emission period BON coming after each one vertical scanning period GateScan, what are called flickers or the like are likely to occur. In other words, in order to shorten the one vertical scanning period GateScan serving as a time for selecting the scanning lines and increase the visibility in the driving based on what is called the field-sequential system, the written potential of each of the pixel electrodes PE (refer to FIG. 7) is required to be easily held during each of the first color light emission period RON, the second color light emission period GON, and the third color light emission period BON.

Figure 10:
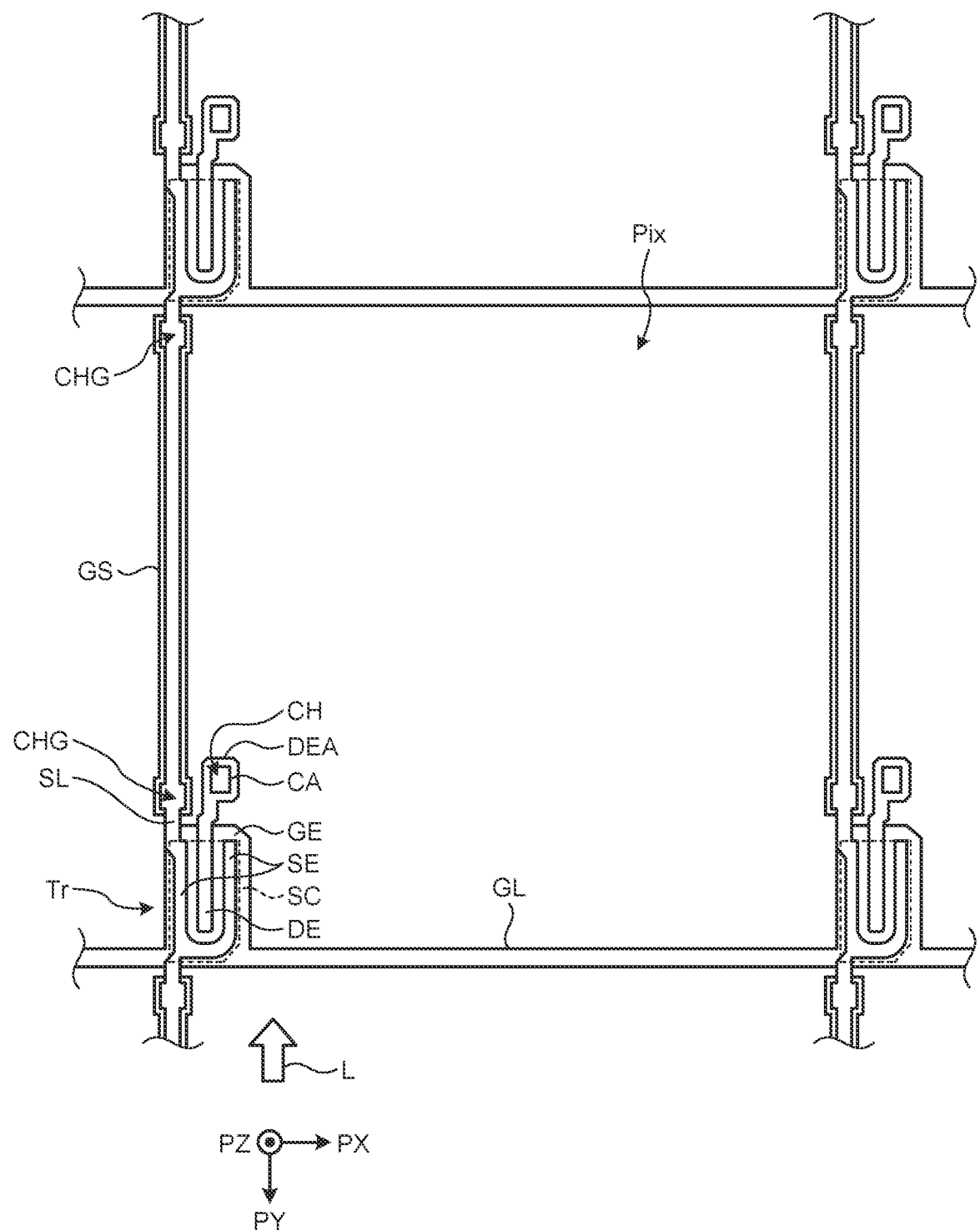
FIG. 10 is a plan view illustrating scanning lines, signal lines, and a switching element in the pixel.
Figure 11:
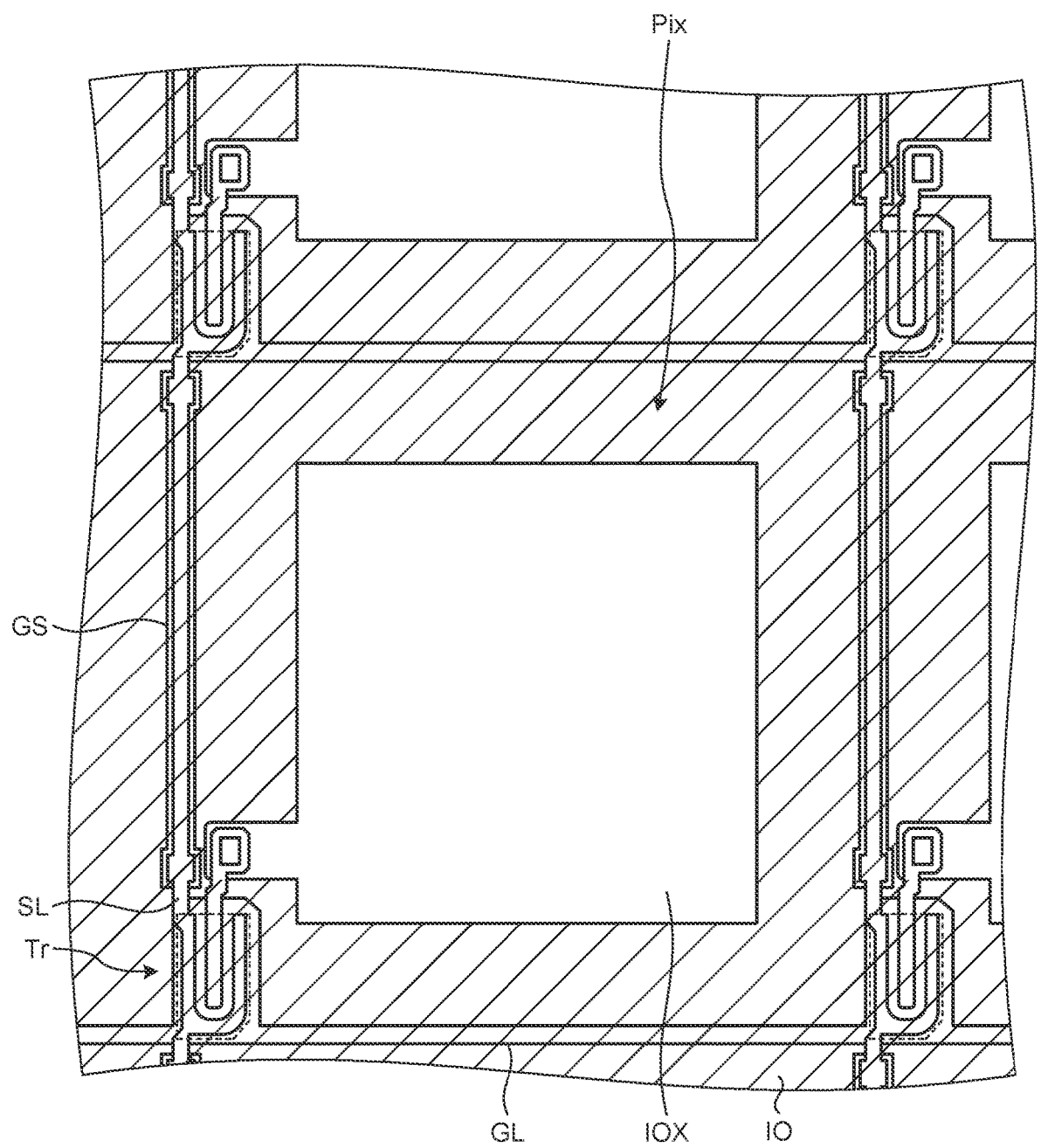
FIG. 11 is a plan view illustrating a holding capacitance layer in the pixel.
Figure 12:
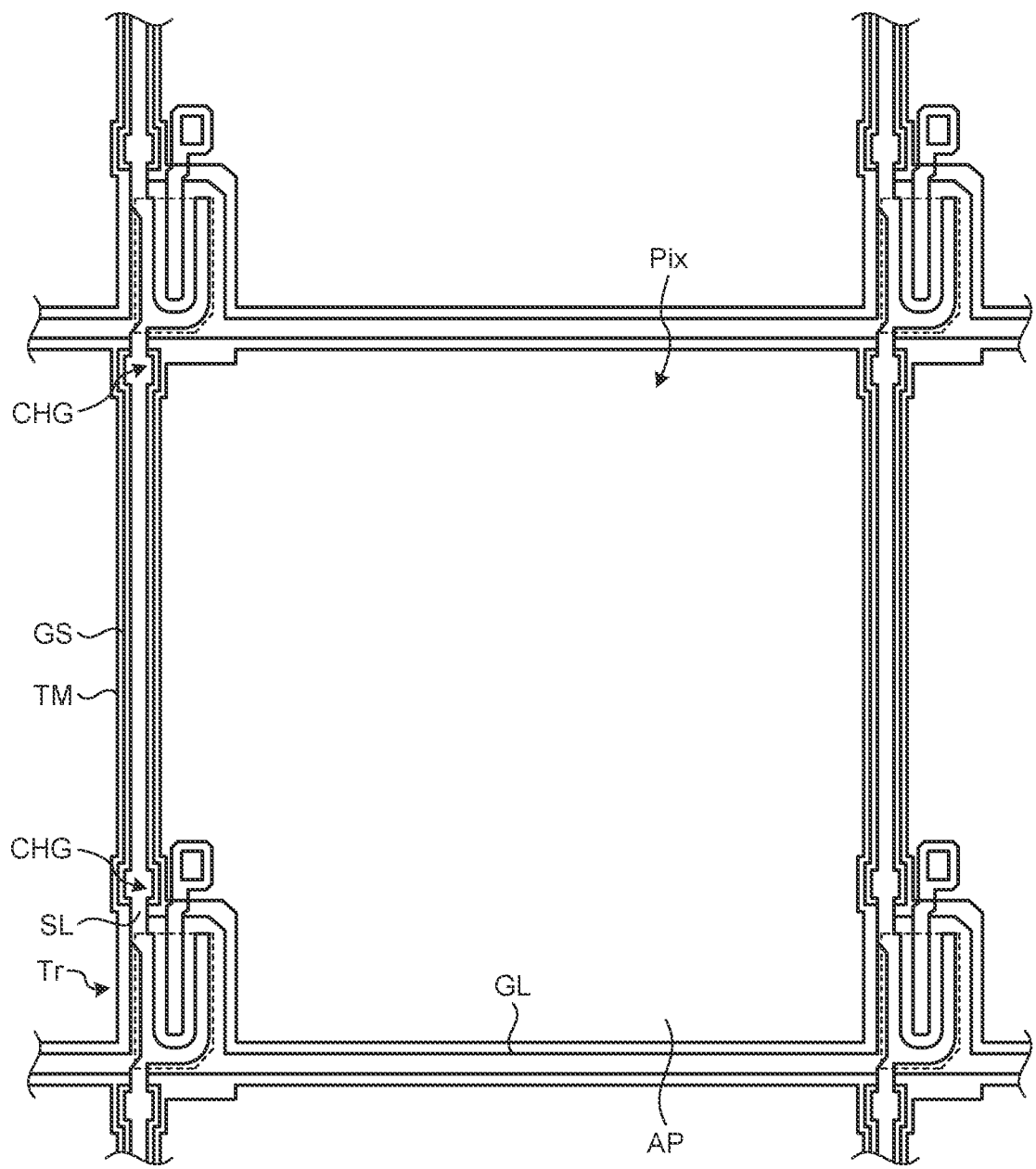
FIG. 12 is a plan view illustrating an auxiliary metal layer and an opening region in the pixel.
Figure 13:
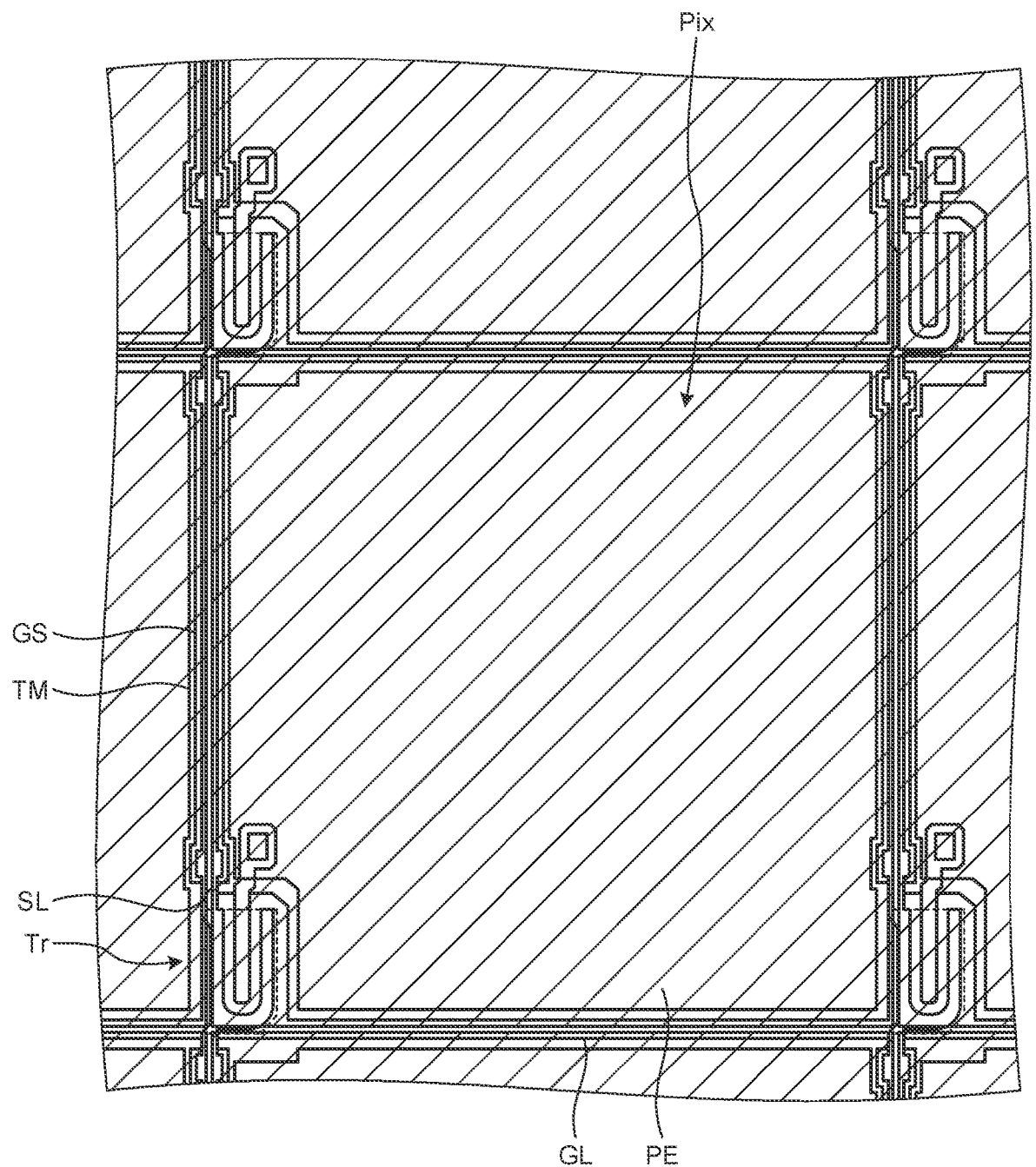
FIG. 13 is a plan view illustrating the pixel electrode in the pixel.
Figure 14:
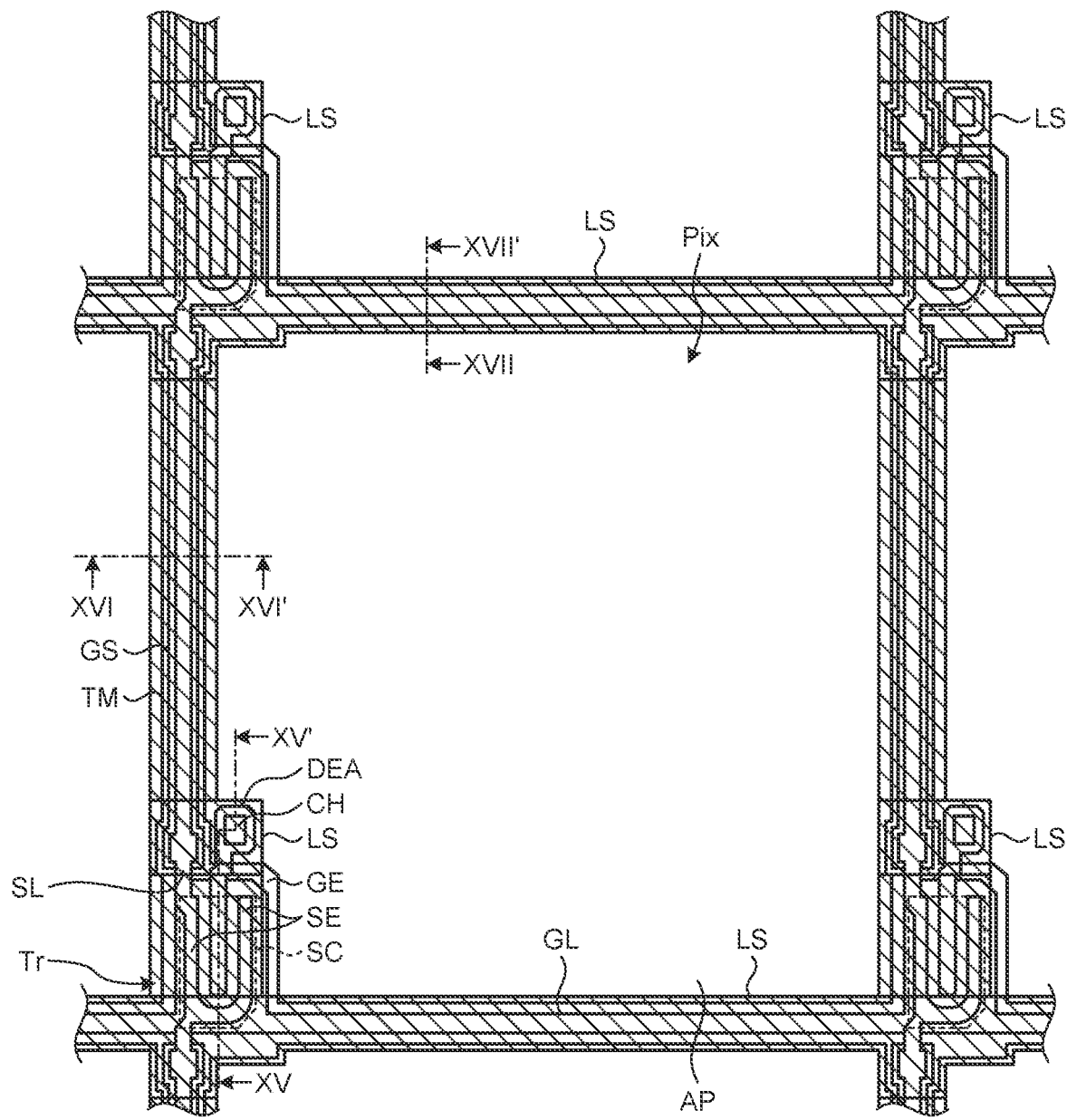
FIG. 14 is a plan view illustrating a light-blocking layer in the pixel.
Figure 15:
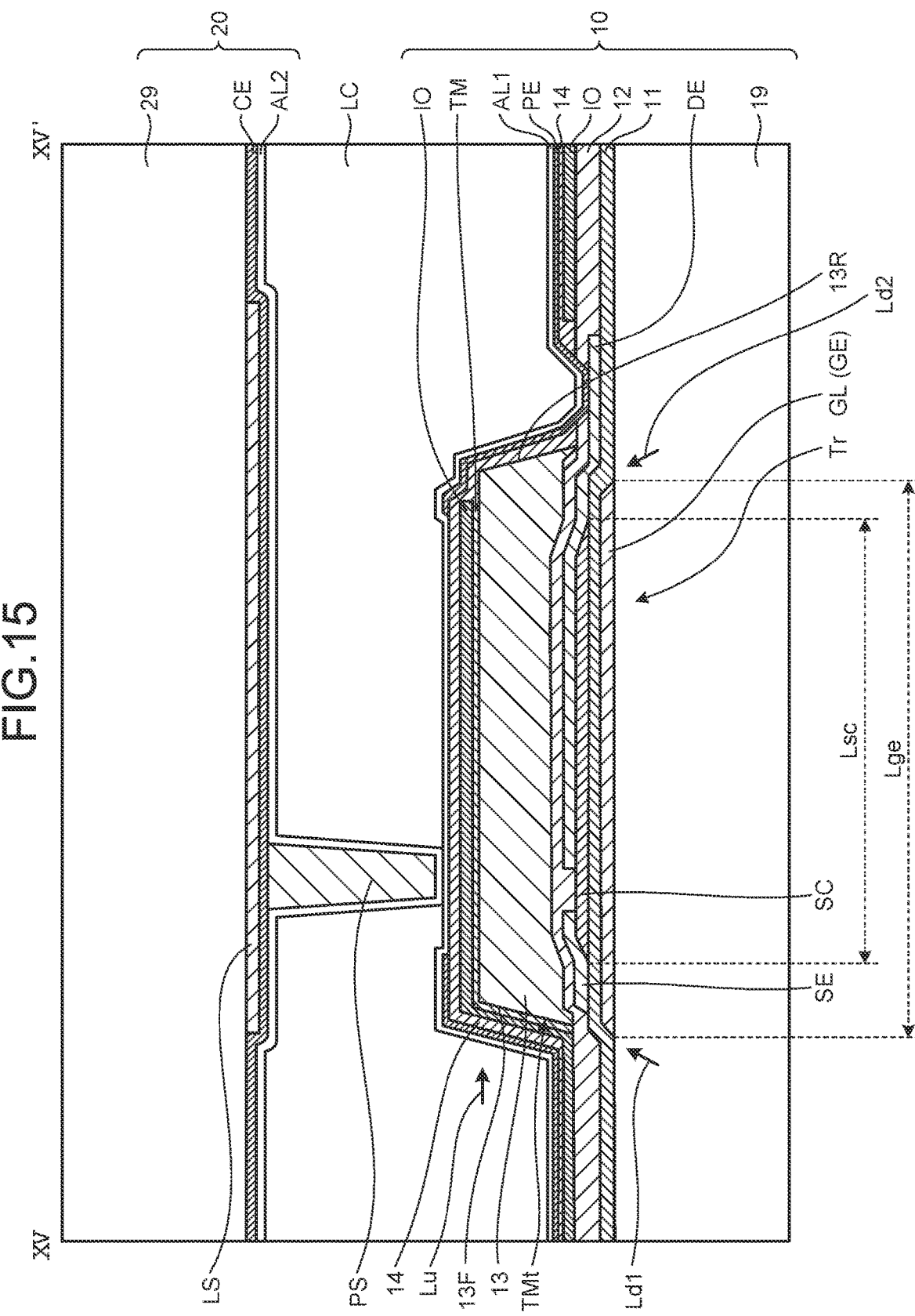
FIG. 15 is a sectional view along XV-XV' of FIG. 14.
Figure 16:
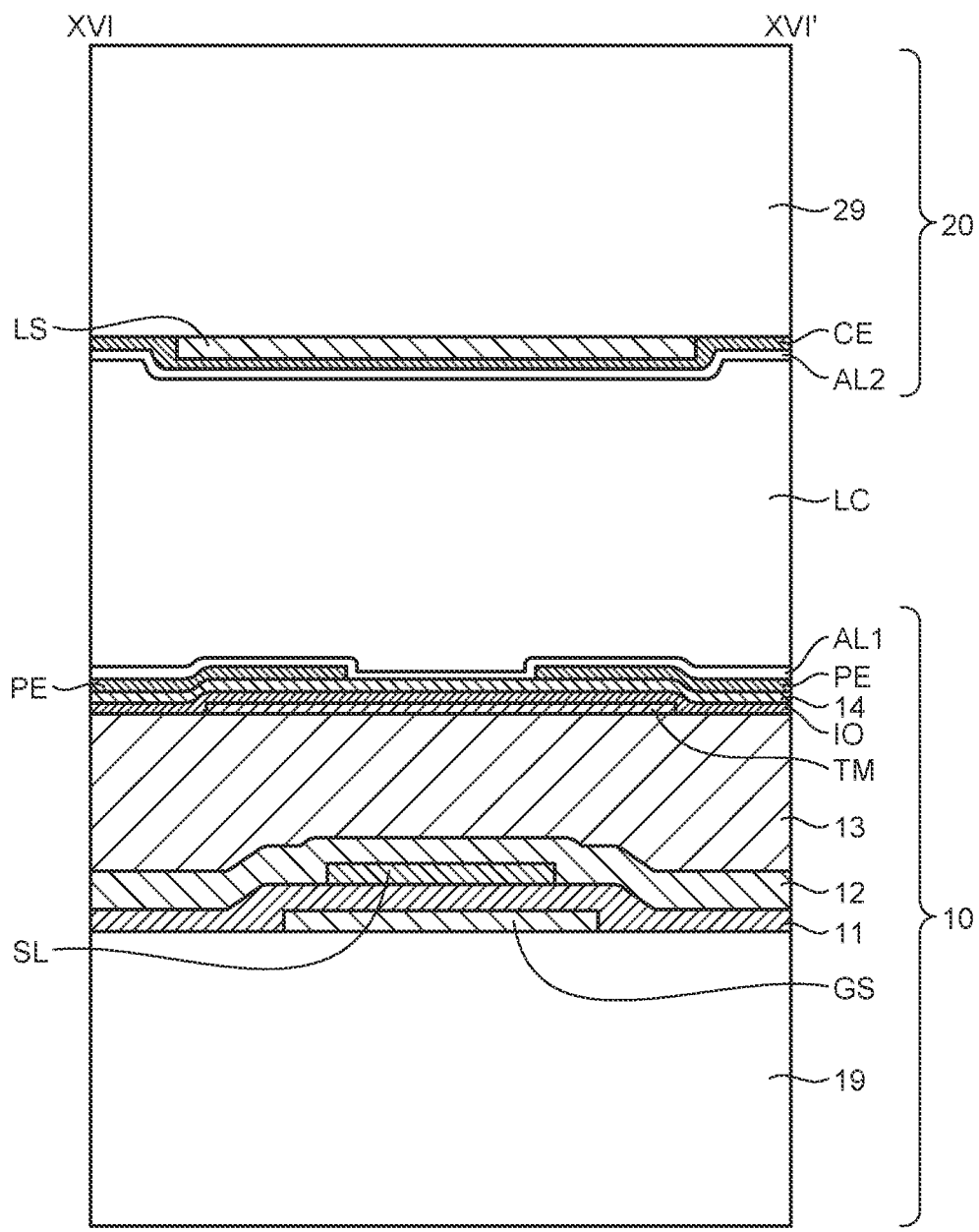
FIG. 16 is a sectional view along XVI-XVI' of FIG. 14.
Figure 17:
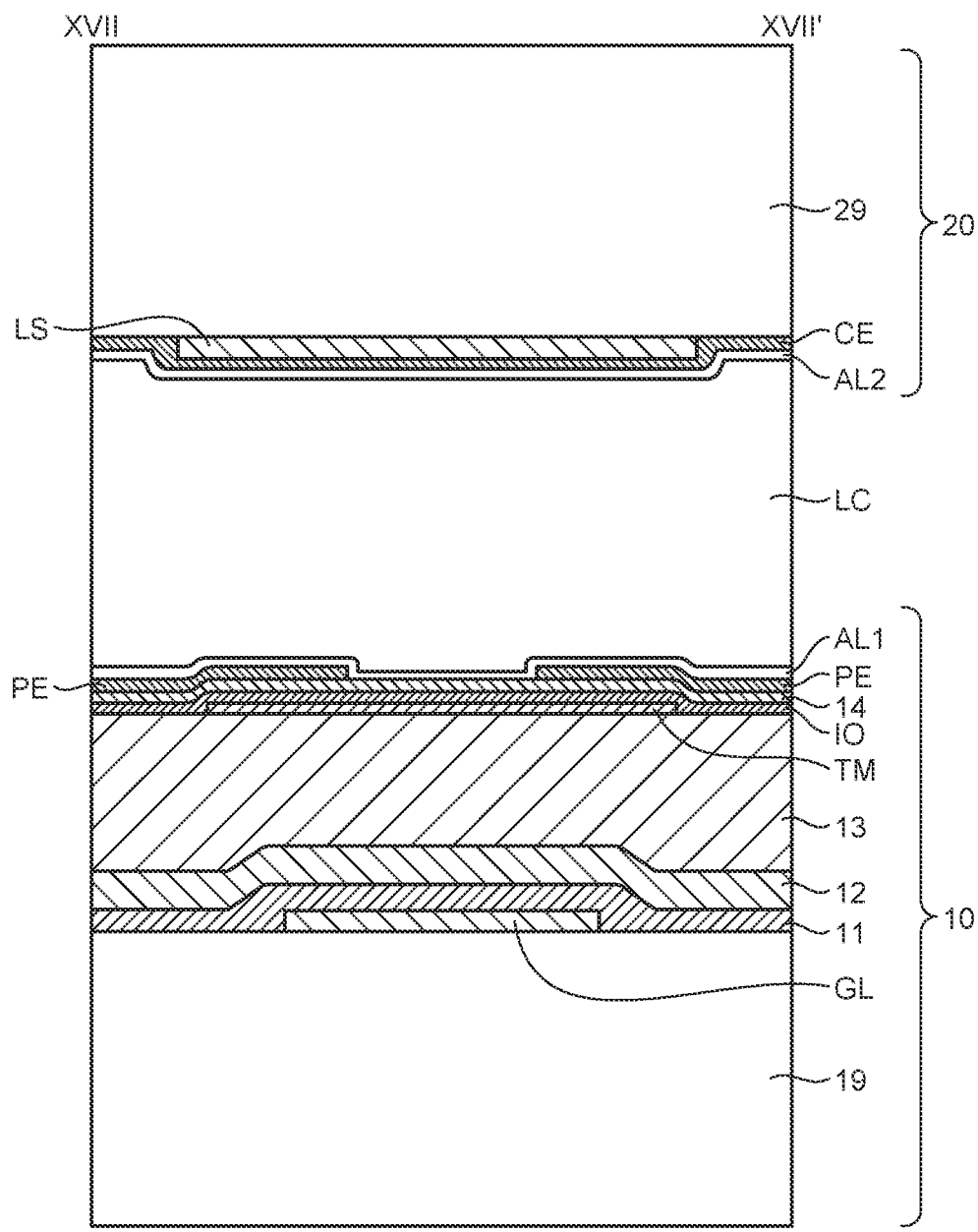
FIG. 17 is a sectional view along XVII-XVII' of FIG. 14.

FIG. 10 is a plan view illustrating the scanning lines, the signal lines, and the switching element in the pixel. FIG. 11 is a plan view illustrating a holding capacitance layer in the pixel. FIG. 12 is a plan view illustrating an auxiliary metal layer and an opening region in the pixel. FIG. 13 is a plan view illustrating the pixel electrode in the pixel. FIG. 14 is a plan view illustrating a light-blocking layer in the pixel. FIG. 15 is a sectional view along XV-XV' of FIG. 14. FIG. 16 is a sectional view along XVI-XVI' of FIG. 14. FIG. 17 is a sectional view along XVII-XVII' of FIG. 14. As illustrated in FIGS. 1, 2, and 10, the array substrate 10 is provided with the signal lines SL and the scanning lines GL so as to form a grid in the plan view. In other words, one surface of the array substrate 10 is provided with the signal lines arranged with spaces in the first direction PX and the scanning lines arranged with spaces in the second direction PY.

As illustrated in FIG. 10, a region surrounded by the adjacent scanning lines GL and the adjacent signal lines SL corresponds to the pixel Pix. The pixel Pix is provided with the pixel electrode PE and the switching element Tr. In the present embodiment, the switching element Tr is a bottom-gate thin film transistor. The switching element Tr includes a semiconductor layer SC overlapping, in the plan view, a gate electrode GE electrically coupled to a corresponding one of the scanning lines GL.

As illustrated in FIG. 10, the scanning lines GL are wiring of a metal such as molybdenum (Mo) or aluminum (Al), a multi-layered body of these metals, or an alloy thereof. The signal lines SL are wiring of a metal, such as aluminum or an alloy thereof.

As illustrated in FIG. 10, the semiconductor layer SC is provided so as not to protrude from the gate electrode GE in the plan view. As a result, the light-source light L traveling toward the semiconductor layer SC from the gate electrode GE side is reflected, and light leakage is less likely to occur in the semiconductor layer SC.

Figure 20:
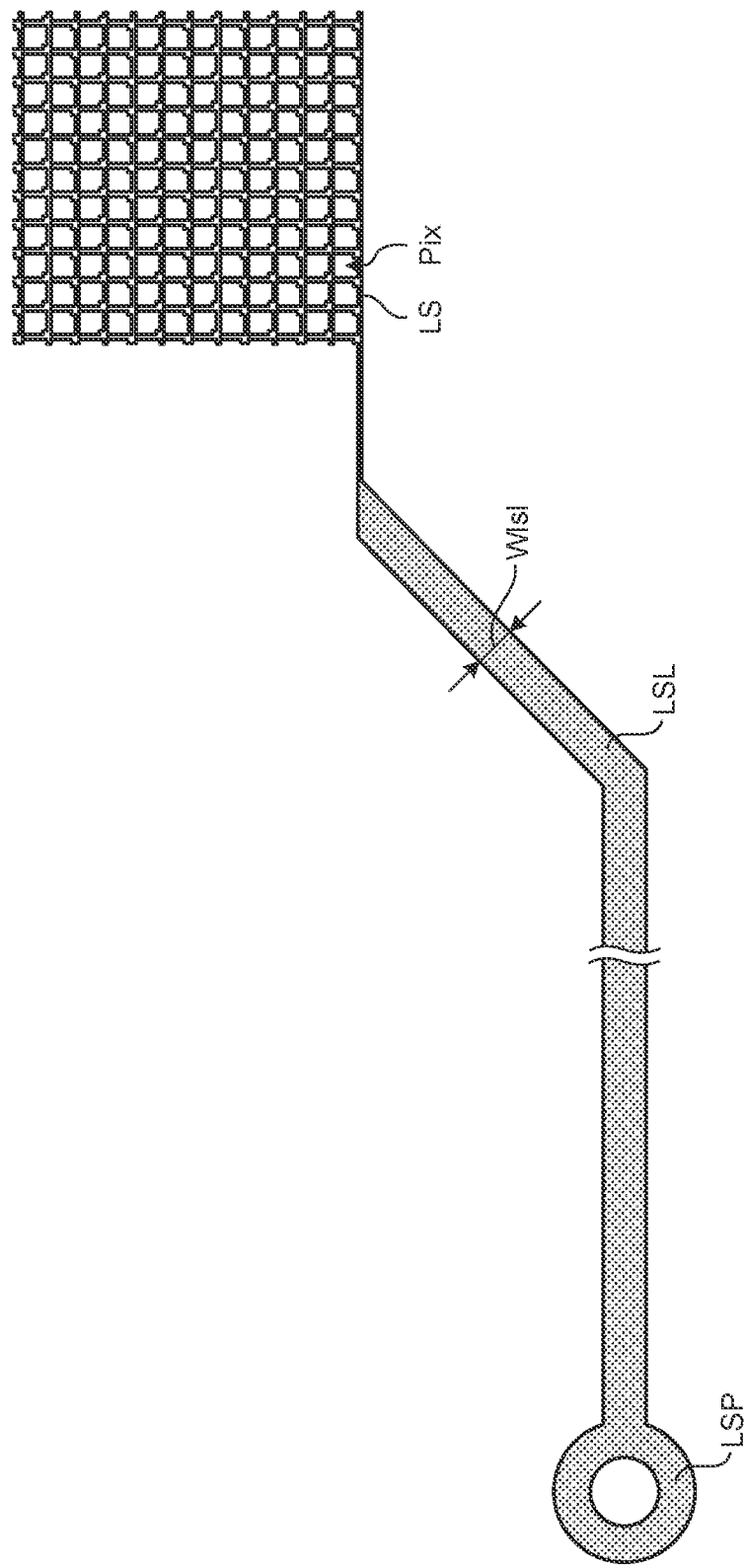
FIG. 20 is a plan view for explaining a coupling line that couples the light-blocking layer to a first power feeding portion.

As illustrated in FIGS. 5 and 20, the light-source light L emitted from the light source 3 is incident in the second direction PY serving as a direction of incidence. The direction of incidence refers to a direction from the second side surface 20D closest to the light source 3 toward the first side surface 20C that is an opposite surface to the second side surface 20D. When the direction of incidence of the light-source light L is the second direction PY, the length in the first direction PX of the semiconductor layer SC is less than the length in the second direction PY of the semiconductor layer SC. This configuration reduces the length in a direction intersecting the direction of incidence of the light-source light L, and thereby, reduces the effect of light leakage.

As illustrated in FIG. 10, two electrical conductors of a source electrode SE that are the same as the signal line SL extend from the signal line SL in the same layer as that of the signal line SL and in a direction intersecting the signal line. With this configuration, the source electrode SE electrically coupled to the signal line SL overlaps one end of the semiconductor layer SC in the plan view.

As illustrated in FIG. 10, in the plan view, a drain electrode DE is provided in a position between the adjacent electrical conductors of the source electrode SE. The drain electrode DE overlaps the semiconductor layer SC in the plan view. A portion of the semiconductor layer SC overlapping neither the source electrode SE nor the drain electrode DE serves as a channel of the switching element Tr. As illustrated in FIG. 13, a contact electrode DEA electrically coupled to the drain electrode DE is electrically coupled to the pixel electrode PE through a contact hole CH.

As illustrated in FIG. 15, the array substrate 10 includes a first light-transmitting base member 19 formed of, for example, glass. The first light-transmitting base member 19 may be any material having a light transmitting capability and may be, for example, a resin such as polyethylene terephthalate.

As illustrated in FIG. 15, the scanning line GL (refer to FIG. 10) and the gate electrode GE are provided on the first light-transmitting base member 19.

In addition, as illustrated in FIG. 15, a first insulating layer 11 is provided so as to cover the scanning line GL and the gate electrode GE. The first insulating layer 11 is formed of, for example, a transparent inorganic insulating material such as silicon nitride.

The semiconductor layer SC is stacked on the first insulating layer 11. The semiconductor layer SC is formed of, for example, amorphous silicon, but may be formed of polysilicon or an oxide semiconductor. When viewed in the same section, a length Lsc of the semiconductor layer SC is less than a length Lge of the gate electrode GE overlapping the semiconductor layer SC. With this configuration, the gate electrode GE can block light Ld1 that has propagated in the first light-transmitting base member 19. As a result, the light leakage of the switching element Tr of the present embodiment is reduced.

The source electrode SE and the signal line SL covering a portion of the semiconductor layer SC and the drain electrode DE covering a portion of the semiconductor layer SC are provided on the first insulating layer 11. The drain electrode DE is formed of the same material as that of the signal line SL. A second insulating layer 12 is provided on the semiconductor layer SC, the signal line SL, and the drain electrode DE. The second insulating layer 12 is formed of, for example, a transparent inorganic insulating material such as silicon nitride, in the same manner as the first insulating layer.

A third insulating layer covering a portion of the second insulating layer 12 is formed on the second insulating layer 12. A third insulating layer 13 is formed of, for example, a light-transmitting organic insulating material such as an acrylic resin. The third insulating layer 13 has a film thickness greater than other insulating films formed of an inorganic material.

As illustrated in FIGS. 15, 16, and 17, some regions have the third insulating layer 13 while the other regions do not have the third insulating layer 13. As illustrated in FIGS. 16 and 17, the regions having the third insulating layer 13 are located over the scanning lines GL and over the signal lines SL. The third insulating layer 13 has a grid shape that extends along the scanning lines GL and the signal lines SL and overlies (i.e., covers) the scanning lines GL and the signal lines SL. As illustrated in FIG. 15, the regions having the third insulating layer 13 are also located over the semiconductor layer SC, that is, over the switching elements Tr. As a result, the switching element Tr, the scanning line GL, and the signal line SL are located at relatively long distances from the holding capacitance electrode IC, and are thereby less affected by a common potential from the holding capacitance electrode IC. In addition, regions on the array substrate 10 not having the third insulating layer 13 are provided in the regions surrounded by the scanning lines GL and the signal lines SL. Thus, regions are provided in which the thickness of the insulating layer is less than the thickness of the insulating layer overlapping the signal lines SL and the scanning lines GL in the plan view. The regions surrounded by the scanning lines GL and the signal lines SL have relatively higher optical transmittance than the regions over the scanning lines GL and over the signal lines SL, and thus, are improved in light transmitting capability.

As illustrated in FIG. 15, a metal layer TM is provided on the third insulating layer 13. The conductive metal layer TM is wiring of a metal, such as molybdenum (Mo) or aluminum (Al), a layered body of these metals, or an alloy thereof. As illustrated in FIG. 12, the metal layer TM is provided in a region overlapping the signal lines SL, the scanning lines GL, and the switching elements Tr in the plan view. With this configuration, the metal layer TM is formed into a grid shape, and openings AP surrounded by the metal layer TM are formed.

As illustrated in FIG. 15, the holding capacitance electrode IO is provided above the third insulating layer 13 and the metal layer TM. The holding capacitance electrode IO is formed of a light-transmitting conductive material such as indium tin oxide (ITO). The holding capacitance electrode IO is also called "third light-transmitting electrode". As illustrated in FIG. 11, the holding capacitance electrode IO has a region IOX including no light-transmitting conductive material in each of the regions surrounded by the scanning lines GL and the signal lines SL. The holding capacitance electrode IO extends across the adjacent pixels Pix and is provided over the pixels Pix. A region of the holding capacitance electrode IO including the light-transmitting conductive material overlaps the scanning line GL or the signal line SL, and extends to the adjacent pixel Pix.

The holding capacitance electrode IO has a grid shape that extends along the scanning lines GL and the signal lines SL and overlies (i.e., covers) the scanning lines GL and the signal lines SL. With this configuration, the holding capacitance HC between the region IOX including no light-transmitting conductive material and the pixel electrode PE is reduced. Therefore, the holding capacitance HC is adjusted by the size of the region IOX including no light-transmitting conductive material.

As illustrated in FIG. 12, the switching element Tr that is coupled to a corresponding one of the scanning lines GL and a corresponding one of the signal lines SL is provided. At least the switching element Tr is covered with the third insulating layer 13 serving as an organic insulating layer, and the metal layer TM having a larger area than that of the switching element Tr is located above the third insulating layer 13. This configuration can reduce the light leakage of the switching element Tr.

More specifically, the array substrate 10 includes the third insulating layer 13 serving as an organic insulating layer that covers at least the switching element Tr, and includes the metal layer TM that is provided on the third insulating layer 13 so as to overlap therewith, and has a larger area than that of the switching element Tr. The region surrounded by the scanning lines GL and the signal lines SL has a region having a thickness less than that of the third insulating layer 13 that overlaps the scanning lines GL and the signal lines SL in the plan view. This configuration forms slant surfaces along which the thickness of the third insulating layer 13 changes, one of the slant surfaces being located on a side of the third insulating layer 13 closer, in the plan view, to the light source 3 than the switching element Tr is. As illustrated in FIGS. 5 and 20, the light-source light L emitted from the light source 3 is incident in the second direction PY serving as a direction of incidence. As illustrated in FIG. 15, the above-described slant surfaces include a first slant surface 13F on a side of the third insulating layer 13 on which light Lu of the light-source light L is incident, and a second slant surface 13R on a side of the third insulating layer 13 opposite to the side on which the light Lu is incident. As illustrated in FIG. 15, a metal layer TMt covers the first slant surface 13F on the side of the third insulating layer 13 on which the light Lu is incident. The metal layer TMt is a tapered portion that is formed of the same material as that of the metal layer TM, and is formed by extending the metal layer TM.

As illustrated in FIG. 15, the light Lu arrives in the direction of incidence. The light Lu is a part of the light-source light L that arrives from the side closer to the light source 3 than the switching element Tr is. The metal layer TMt blocks the light Lu, and thereby, reduces light leakage.

If the second slant surface 13R is covered with the metal layer TM and the background of the counter substrate 20 is visible from the array substrate 10, light Ld2 viewed by the viewer is reflected by the metal layer TM covering the second slant surface 13R, and the reflected light may be visible by the viewer. In the present embodiment, none of the metal layer TM covers the second slant surface 13R. As a result, the display device of the present embodiment reduces the reflected light that hinders the vision of the viewer.

The metal layer TM may be located on the upper side of the holding capacitance electrode IC, and only needs to be stacked with the holding capacitance electrode IC. The metal layer TM has a lower electrical resistance than that of the holding capacitance electrode IC. Therefore, the potential of the holding capacitance electrode IC is restrained from varying with the position where the pixel Pix is located in the display region AA.

As illustrated in FIG. 12, the width of the metal layer TM overlapping the signal line SL is greater than the width of the signal line SL in the plan view. This configuration restrains reflected light reflected by edges of the signal line SL from being emitted from the display panel 2. The width of the metal layer TM and the width of the signal line SL are lengths in a direction intersecting the extending direction of the signal line SL. The width of the metal layer TM overlapping the scanning line GL is larger than the width of the scanning line GL. The width of the metal layer TM and the width of the scanning line GL are lengths in a direction intersecting the extending direction of the scanning line GL.

As illustrated in FIG. 15, a fourth insulating layer 14 is provided on the upper side of the holding capacitance electrode IO and the metal layer TM. The fourth insulating layer 14 is an inorganic insulating layer formed of, for example, a transparent inorganic insulating material such as silicon nitride.

As illustrated in FIG. 15, the pixel electrode PE is provided on the fourth insulating layer 14. The pixel electrode PE is formed of a light-transmitting conductive material such as ITO. The pixel electrode PE is electrically coupled to the contact electrode DEA through the contact hole CH provided in the fourth insulating layer 14, the third insulating layer 13, and the second insulating layer 12. As illustrated in FIG. 13, each of the pixel electrodes PE is partitioned off on a pixel Pix basis. The first orientation film AL1 is provided on the upper side of the pixel electrode PE.

As illustrated in FIG. 15, the counter substrate 20 includes a second light-transmitting base member 29 formed of, for example, glass. The material of the second light-transmitting base member 29 may be any material having a light transmitting capability and may be, for example, a resin such as polyethylene terephthalate. The second light-transmitting base member 29 is provided with the common electrode CE. The common electrode CE is formed of a light-transmitting conductive material such as ITO. The second orientation film AL2 is provided on a surface of the common electrode CE.

The counter substrate 20 includes a light-blocking layer LS between the second light-transmitting base member 29 and the common electrode CE. The light-blocking layer LS is formed of a conductive metal material. The light-blocking layer LS is formed of layers of one or more types of metals selected from aluminum (Al), copper (Cu), silver (Ag), molybdenum (Mo), chromium (Cr), titanium (Ti), and tungsten (W). Alternatively, the light-blocking layer LS is formed of an alloy containing one or more types of materials selected from these metal materials. The light-blocking layer LS may also be a multi-layered body obtained by stacking a plurality of conductive layers of these metal materials or an alloy containing one or more types of these materials. The light-blocking layer LS may be formed by stacking conductive layers of a light-transmitting conductive oxide such as ITO. The light-blocking layer LS may be a layered body of blackened films, black organic films, or black conductive organic films obtained by combining the metal materials and the conductive layers described above.

A spacer PS is formed between the array substrate 10 and the counter substrate 20. The spacer PS is located between the common electrode CE and the second orientation film AL2.

As illustrated in FIGS. 12 and 16, in the display device of the present embodiment, a light-blocking layer GS located in the same layer as that of the scanning line GL is provided in a position extending along the signal line SL and overlapping a portion of the signal line SL. The light-blocking layer GS is formed of the same material as that of the scanning line GL. The light-blocking layer GS is not provided at a portion where the scanning line GL intersects the signal line SL in the plan view.

As illustrated in FIG. 12, the light-blocking layer GS is electrically coupled to the signal line SL through a contact hole CHG. With this configuration, the wiring resistance of a combination of the light-blocking layer GS and the signal line SL is lower than that of only the signal line SL. As a result, the delay of the gradation signal supplied to the signal line SL is reduced. The contact hole CHG need not be provided, and the light-blocking layer GS need not be coupled to the signal line SL.

As illustrated in FIG. 16, the light-blocking layer GS is provided opposite to the metal layer TM with the signal line SL therebetween. The width of the light-blocking layer GS is greater than that of the signal line SL and less than that of the metal layer TM. The width of the light-blocking layer GS, the width of the metal layer TM, and the width of the signal line SL are lengths in a direction intersecting the extending direction of the signal line SL. In this manner, the light-blocking layer GS has a greater width than that of the signal line SL, and thus, restrains the reflected light reflected by the edges of the signal line SL from being emitted from the display panel 2. As a result, the visibility of images is improved in the display device 1.

As illustrated in FIGS. 14 and 15, the counter substrate 20 is provided with the light-blocking layer LS. The light-blocking layer LS is provided in a region overlapping the signal lines SL, the scanning lines GL, and the switching elements Tr in the plan view.

As illustrated in FIGS. 14, 15, 16, and 17, the light-blocking layer LS has a greater width than that of the metal layer TM. This configuration restrains reflected light reflected by edges of the signal line SL, the scanning line GL, and the metal layer TM from being emitted from the display panel 2. As a result, the visibility of images is improved in the display device 1.

The contact hole CH and the contact hole CHG are likely to diffusely reflect the light-source light L emitted thereto. Therefore, the light-blocking layer LS is provided in a region overlapping the contact hole CH and the contact hole CHG in the plan view.

As illustrated in FIG. 15, the spacer SP is disposed between the array substrate 10 and the counter substrate 20, and improves the uniformity of the distance between the array substrate 10 and the counter substrate 20.

Figure 18:
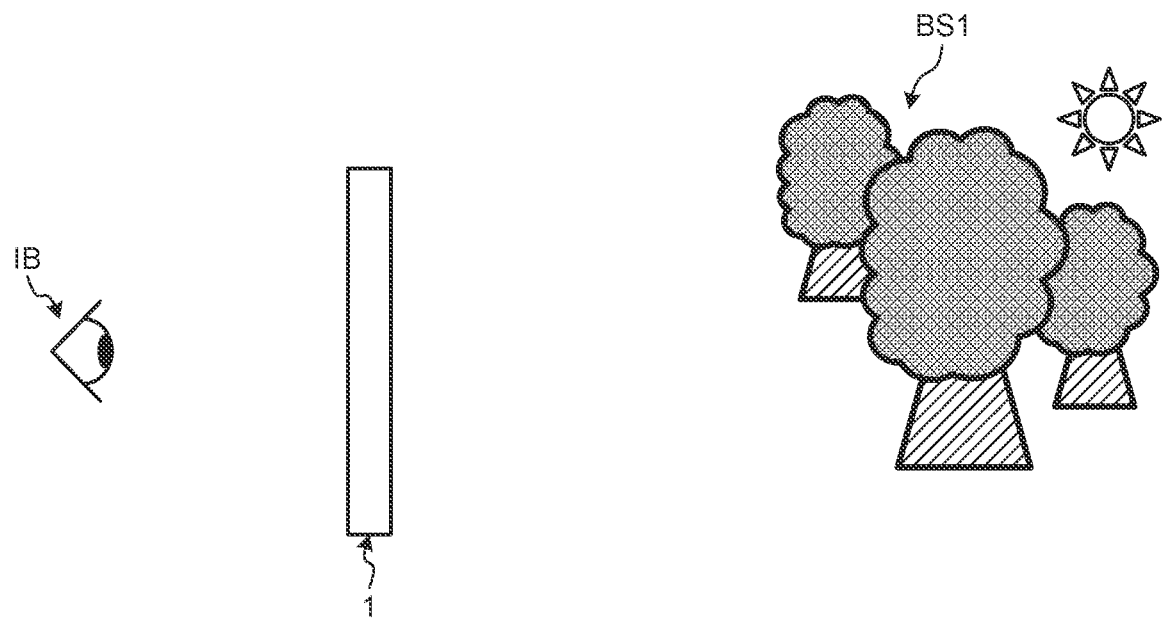
FIG. 18 is an explanatory diagram explaining a relation between a viewer and a background, the viewer viewing the background from one surface side, the background being located on the other surface side opposite to the one surface side.
Figure 19:
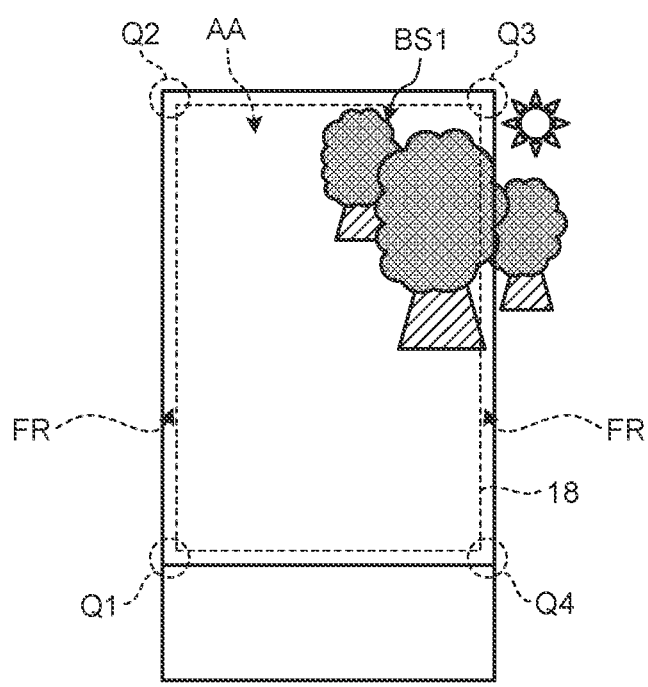
FIG. 19 is an explanatory diagram explaining an example in which a peripheral region overlaps the background.

FIG. 18 is an explanatory diagram explaining a relation between the viewer and the background, the viewer viewing the background from one surface side, the background being located on the other surface side opposite to the one surface side. FIG. 19 is an explanatory diagram explaining an example in which the peripheral region overlaps the background. As illustrated in FIG. 18, when a viewer IB views the other surface side of the display device 1 from the one surface side thereof, a background BS1 is viewed through the display device 1. If the peripheral region FR outside the display region AA does not transmit light, the background BS1 is invisible and thereby, a sense of discomfort may be caused. Therefore, the background BS1 on the other surface side opposite to the one surface side is made visible from the one surface side of the display device 1 through also the peripheral region FR, as illustrated in FIG. 19.

Figure 21:
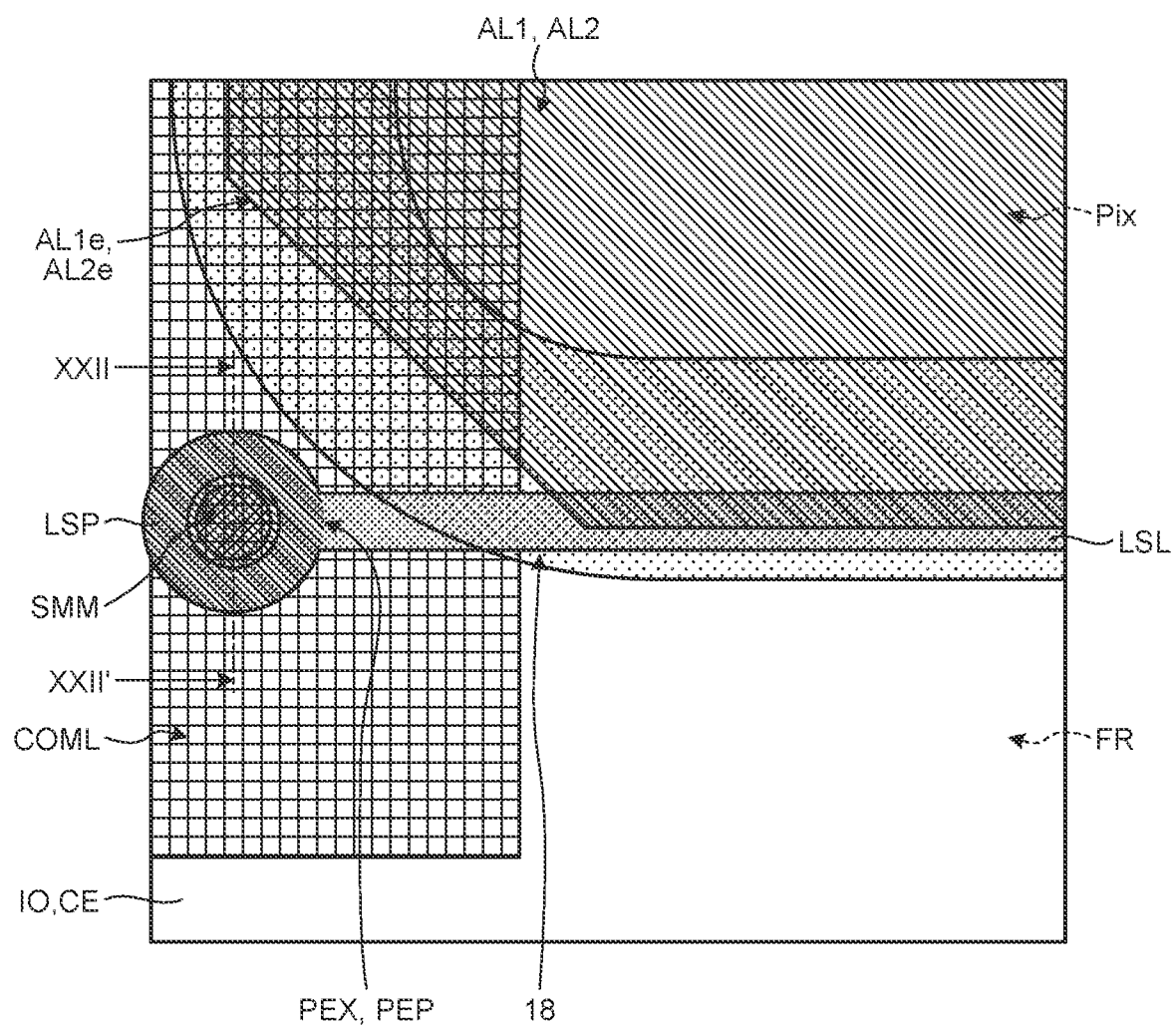
FIG. 21 is a plan view illustrating common potential wiring, a sealing portion, the first power feeding portion, and the coupling line for explaining a portion where an inter-substrate conductor is present.
Figure 22:
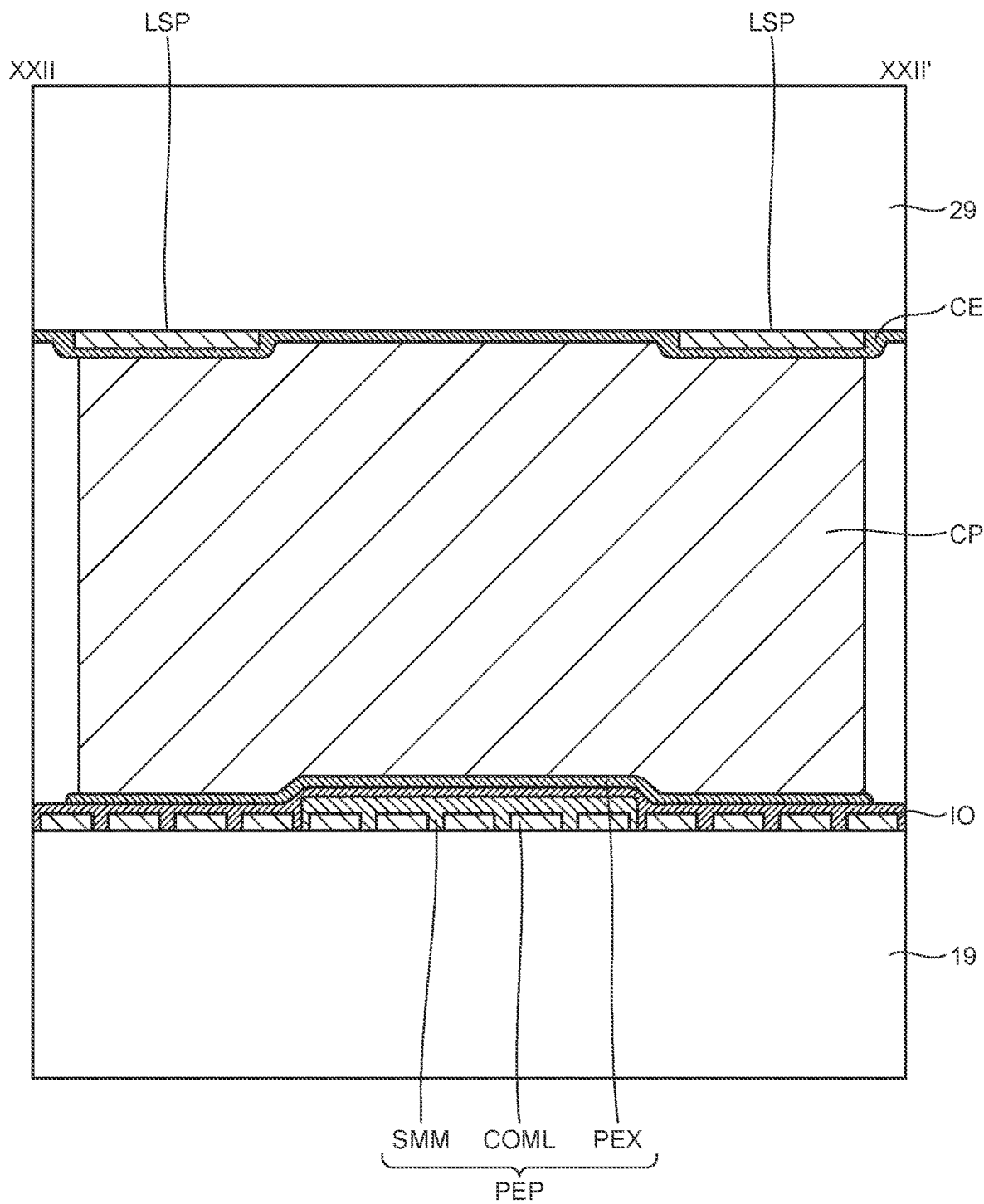
FIG. 22 is a sectional view along XXII-XXII' of FIG. 21.

FIG. 20 is a plan view for explaining a coupling line that couples the light-blocking layer to a first power feeding portion. FIG. 21 is a plan view illustrating the common potential wiring, the sealing portion, the first power feeding portion, and the coupling line for explaining a portion where an inter-substrate conductor is provided. FIG. 22 is a sectional view along XXII-XXII' of FIG. 21. As described above, the light-blocking layer LS provided in the region overlapping the signal lines SL, the scanning lines GL, and the switching elements Tr illustrated in FIG. 20, is provided in the display region AA described above, and the regions surrounded by the light-blocking layer LS correspond to the pixels Pix.

A first power feeding portion LSP is disposed in at least one of portions Q1, Q2, Q3 and Q4 near corners of the display region AA, in the peripheral region FR outside the display region AA illustrated in FIG. 19. FIG. 20 illustrates, as an example, the light-blocking layer LS, the first power feeding portion LSP, and coupling wiring LSL in Q1 of FIG. 19.

The coupling wiring LSL couples the first power feeding portion LSP to the light-blocking layer LS. As illustrated in FIG. 20, the first power feeding portion is an annular body. The coupling wiring LSL and the first power feeding portion LSP are each formed of layers of one or more types of metals selected from aluminum (Al), copper (Cu), silver (Ag), molybdenum (Mo), chromium (Cr), titanium (Ti), and tungsten (W). Alternatively, the coupling wiring LSL and the first power feeding portion LSP are each formed of an alloy containing one or more types of materials selected from these metal materials. The coupling wiring LSL and the first power feeding portion LSP may each also be a multi-layered body obtained by stacking a plurality of conductive layers of these metal materials or an alloy containing one or more types of these materials. The coupling wiring LSL and the first power feeding portion LSP may each be formed by stacking conductive layers of a light-transmitting conductive oxide such as ITO. The coupling wiring LSL and the first power feeding portion LSP may each be a multi-layered body of blackened films, black organic films, or black conductive organic films obtained by combining the metal materials and the conductive layers described above. When the coupling wiring LSL and the first power feeding portion LSP are black, the coupling wiring is less visible. The coupling wiring LSL and the first power feeding portion LSP are the same layer and formed of the same material as the light-blocking layer LS. As a result, the coupling wiring LSL and the first power feeding portion LSP have a light-blocking property.

A width Wls1 of the coupling wiring LSL is preferably greater than the width of the light-blocking layer LS. The width Wls1 of the coupling wiring LSL is, for example, from 0.1 mm to 0.5 mm.

As an example, the width Wls1 of the coupling wiring LSL is 0.3 mm. This coupling wiring having a width of 0.3 mm may be made up of one wiring line or made by arranging three coupling wiring lines LSL each having a width of 0.1 mm. As described above, the peripheral region FR is a transparent region where the background is visible in the same manner as in the display region AA, and the coupling wiring LSL is disposed in the transparent peripheral region FR allowing the background to be seen. Therefore, the width Wls1 of the coupling wiring LSL is preferably small enough so as not to be an obstacle to the viewer.

As illustrated in FIG. 21, a part of the coupling wiring LSL is disposed in a position partially overlapping the sealing portion 18. The sealing portion 18 of the present embodiment is formed of a light transmitting resin material. An outer edge AL1e of the first orientation film AL1 and an outer edge AL2e of the second orientation film AL2 overlap the sealing portion 18. This configuration makes the outer edge AL1e of the first orientation film AL1 and the outer edge AL2e of the second orientation film AL2 less visible, and improves the display quality.

The mesh-shaped common potential wiring COML is located in the peripheral region FR. The common potential wiring COML is in the same layer as that of the scanning line GL described above, and is formed of the same material as the scanning line GL. The common potential wiring COML is coupled to the common potential drive circuit 45 illustrated in FIG. 2. This configuration reduces noise that would be generated in the display region AA. Since the common potential wiring COML has a mesh shape, light passes through open portions having no metal.

As illustrated in FIG. 21, the common electrode CE extends from the display region AA across the sealing portion 18 until being electrically coupled to the first power feeding portion LSP.

As illustrated in FIG. 22, an inter-substrate conductor CP is provided between a second power feeding portion PEP and the first power feeding portion LSP. The inter-substrate conductor CP is a conductive pillar (pillar) or a pillar of resin material that contains conductive particles such as Au particles.

The second power feeding portion PEP is a portion of the array substrate in contact with the inter-substrate conductor CP. In the present embodiment, as illustrated in FIGS. 21 and 22, the second power feeding portion PEP having a metal layer SMM filling the meshes of the common potential wiring COML is located in a position overlapping an opening of the annular body of the first power feeding portion LSP. The metal layer SMM is formed of the same material as that of the signal line SL. The holding capacitance electrode IO covers over the metal layer SMM and the common potential wiring COML. A light-transmitting conductive material layer PEX is provided above the holding capacitance electrode IO. As illustrated in FIG. 21, the light-transmitting conductive material layer PEX has a circular shape having substantially the same diameter as that of the first power feeding portion LSP. The light-transmitting conductive material layer PEX is formed of the same material as that of the pixel electrode PE. When the holding capacitance electrode IO and the light-transmitting conductive material layer PEX are made of the same light-transmitting conductive material (such as ITO), the thickness of the light-transmitting conductive material (such as ITO) of the second power feeding portion PEP is greater than that of the surrounding region. The metal layer SMM is covered with the light-transmitting conductive material (such as ITO). This configuration reduces the contact resistance between the second power feeding portion PEP and the inter-substrate conductor CP.

As described above, the display device 1 includes the array substrate 10, the counter substrate 20, the liquid crystal layer 50, and the light source 3. The array substrate 10 includes the pixel electrodes PE serving as first light-transmitting electrodes each disposed in a corresponding one of the pixels Pix. The array substrate 10 is provided with the signal lines SL arranged with spaces in the first direction PX and the scanning lines GL arranged with spaces in the second direction PY. The counter substrate 20 includes the common electrodes CE serving as second light-transmitting electrodes in positions overlapping the pixel electrodes PE in the plan view. The liquid crystal layer 50 includes the polymer-dispersed liquid crystals LC filled between the array substrate 10 and the counter substrate 20. The light emitters 31 of the light source 3 emit the light in the second direction PY to a side surface of the counter substrate 20. The direction of incidence of the light that propagates in the array substrate 10 and the counter substrate 20 is the second direction. The light emitters 31 may emit the light that propagates in the array substrate 10 and the counter substrate 20 toward a side surface of the array substrate 10.

The array substrate 10 includes the signal lines SL arranged with spaces in the first direction PX and the scanning lines GL arranged with spaces in the second direction PY in the display region AA. The peripheral region FR outside the display region AA includes the common potential wiring COML that is supplied with a constant potential.

In the peripheral region FR located outside the display region AA, the background of the counter substrate 20 is visible from the array substrate 10, and the background of the array substrate 10 is visible from the counter substrate 20. To improve the transmittance of the peripheral region FR of the counter substrate 20, the amount of metal material disposed in the peripheral region FR of the counter substrate 20 needs to be reduced. This reduction increases the resistance between the common potential wiring COML of the array substrate 10 and the common electrode CE provided on the counter substrate 20, which may increase the likelihood of crosstalk. However, in the present embodiment, the counter substrate 20 is provided with the conductive light-blocking layer LS, the first power feeding portion LSP, and the coupling wiring LSL. The conductive light-blocking layer LS is stacked to be electrically coupled to the common electrode CE and overlaps the signal lines SL or the scanning lines GL. The first power feeding portion LSP is conductive and is electrically coupled to the common potential wiring COML through the inter-substrate conductor CP. The coupling wiring LSL electrically couples the first power feeding portion LSP to the light-blocking layer LS. As a result, the resistance between the common potential wiring COML of the array substrate 10 and the common electrode CE provided on the counter substrate 20 is reduced, and thus, the crosstalk is reduced.

As a result, the background BS1 is visible in the display region AA and the peripheral region FR without a sense of discomfort when the peripheral region FR outside the display region AA is compared with the display region AA. The display device 1 of the present embodiment improves the display quality while reducing the sense of discomfort when the background BS1 is viewed in the peripheral region outside the display region AA.

While the preferred embodiment has been described above, the present disclosure is not limited to such an embodiment. The content disclosed in the embodiment is merely an example, and can be variously modified within the scope not departing from the gist of the present disclosure. Any modifications appropriately made within the scope not departing from the gist of the present disclosure also naturally belong to the technical scope of the present disclosure. For example, the first power feeding portion LSP, the second power feeding portion PEP, and the inter-substrate conductor CP are not limited to the example of being disposed in at least one of the portions Q1, Q2, Q3, and Q4 near the corners of the display region AA, in the peripheral region FR outside the display region AA illustrated in FIG. 19, and may be formed in two portions, that is, in the portions Q1 and Q4 or the portions Q2 and Q3 near the corners of the display region AA. Alternatively, the first power feeding portion LSP, the second power feeding portion PEP, and the inter-substrate conductor CP may be formed in all the four portions Q1 to Q4 near the corners of the display region AA, in the peripheral region FR outside the display region AA illustrated in FIG. 19. The structure may be such that the first power feeding portion LSP, the second power feeding portion PEP, and the inter-substrate conductor CP are formed in at least two or three of the four portions Q1 to Q4 near the corners of the display region AA, in the peripheral region FR outside the display region AA illustrated in FIG. 19.

The present embodiment has been described on the assumption that the switching element Tr has a bottom-gate structure. However, as described above, the switching element Tr is not limited to the bottom-gate structure, and may have a top-gate structure. If the switching element Tr has the top-gate structure, referring to the layered insulating film structure of FIG. 15, the structure will be such that the semiconductor layer SC is disposed between the first light-transmitting base member 19 and the first insulating layer, the gate electrode GE is disposed between the first insulating layer 11 and the second insulating layer 12, and the source electrode SE and the contact electrode DEA are formed between the second insulating layer 12 and the third insulating layer 13.

The first power feeding portion LSP may be reworded as, for example, "upper land", "first pad", or "first transfer portion". In the same manner, the second power feeding portion PEP may be reworded as, for example, "under land", "second pad", or "second transfer portion".

In addition, a direct-current voltage may be supplied as the common potential. That is, the common potential may be constant. Alternatively, an alternating-current voltage may be shared as the common potential. That is, the common potential may have two values of an upper limit value and a lower limit value. The common potential is supplied to the holding capacitance electrode IC and the common electrode CE regardless of whether the common potential is a direct-current potential or an alternating-current potential.

As the third insulating layer 13 serving as a grid-shaped organic insulating film, the structure is disclosed in which the third insulating layer 13 inside the grid-shaped region is entirely removed, and the second insulating layer 12 and the holding capacitance electrode IC in the lower layers are exposed. However, the present disclosure is not limited to this structure. For example, the structure may be obtained by using a halftone exposure technique to leave a thin part of the third insulating layer 13 inside the grid-shaped region surrounded by the signal lines SL and the scanning lines GL. With this structure, the thickness of the third insulating layer 13 inside the grid-shaped region is made less than the thickness of the grid-shaped region surrounded by the signal lines SL and the scanning lines GL.

What is claimed is:

1. A display panel comprising:
an array substrate comprising
a plurality of pixel electrodes in a display region, and
common potential wiring outside the display region;
a counter substrate comprising
a light-blocking layer formed of a conductive material, and
a common electrode stacked on the light-blocking layer;
a liquid crystal layer between the array substrate and the counter substrate; and
an inter-substrate conductor,
wherein
the light-blocking layer comprises
a first portion having a grid shape in the display region, and
a second portion having a linear shape and disposed outside the display region,
the second portion has
a first end connected to the first portion, and
a second end opposed to the first end, the second end having an annular body,
the common potential wiring has a mesh shape and is overlapped by the inter-substrate conductor, and
the common potential wiring having the mesh shape is connected to the annular body of the second portion via the inter-substrate conductor, and overlaps an opening of the annular body of the second portion.

2. The display panel according to claim 1, wherein
the liquid crystal layer is formed of polymer-dispersed liquid crystals, and
a background of the counter substrate is visible from the array substrate, and
a background of the array substrate is visible from the counter substrate, in a peripheral region located outside the display region.

3. The display panel according to claim 2, wherein
the common electrode overlaps an entirety of the opening of the annular body, and
the inter-substrate conductor is directly in contact with the common electrode in the opening of the annular body.

4. The display panel according to claim 2, further comprising a sealing portion, wherein
the counter substrate further comprises an orientation film, and
an outer edge of the orientation film overlaps the sealing portion.

5. The display panel according to claim 2, wherein a line width of the second portion is 0.1 mm to 0.5 mm.

6. The display panel according to claim 2, wherein
the array substrate further comprises a capacitance electrode that has a grid-shape in the display region,
the capacitance electrode having the grid-shape overlaps the first portion of the light-blocking layer in the display region,
the capacitance electrode is in contact with the common potential wiring having the mesh shape in a region where the inter-substrate conductor is located, and the capacitance electrode overlaps the opening of the annular body of the second portion in the peripheral region.

\* \* \* \* \*